US011972212B2

(12) United States Patent
Sackett et al.

(10) Patent No.: US 11,972,212 B2
(45) Date of Patent: Apr. 30, 2024

(54) OPEN INPUT CLASSIFIER WITH ENTAILMENT

(71) Applicant: WOEBOT LABS, INC., San Francisco, CA (US)

(72) Inventors: Casey Sackett, San Francisco, CA (US); Andi Molyneux, San Francisco, CA (US); Joe Gallagher, San Francisco, CA (US)

(73) Assignee: WOEBOT LABS, INC., San Francisco, CA (US)

( * ) Notice: Subject to any disclaimer, the term of this patent is extended or adjusted under 35 U.S.C. 154(b) by 0 days.

(21) Appl. No.: 17/984,694

(22) Filed: Nov. 10, 2022

(65) Prior Publication Data

US 2023/0147359 A1 May 11, 2023

Related U.S. Application Data

(60) Provisional application No. 63/277,918, filed on Nov. 10, 2021.

(51) Int. Cl.
*G06F 40/289* (2020.01)
*G06F 18/20* (2023.01)

(52) U.S. Cl.
CPC .......... *G06F 40/289* (2020.01); *G06F 18/20* (2023.01); *G06F 2218/10* (2023.01)

(58) Field of Classification Search
CPC .... G06F 40/289; G06F 18/20; G06F 2218/10; G06F 40/279; G06F 40/35; G06F 40/30;
(Continued)

(56) References Cited

U.S. PATENT DOCUMENTS 9,542,386 B2 * 1/2017 Andrade Silva ........ G06F 40/30
10,025,849 B2 * 7/2018 Kim ........................ G06F 16/93
(Continued)

OTHER PUBLICATIONS

Yoshioka et al. ("BERT-based ensemble methods with data augmentation for legal textual entailment in COLIEE statute law task"), Proceedings of the Eighteenth International Conference on Artificial Intelligence and Law, Jun. 2021pp. 278-284). (Year: 2021).*

*Primary Examiner* — Abdelali Serrou
(74) *Attorney, Agent, or Firm* — NIXON PEABODY LLP

(57) ABSTRACT

A natural language processing combination classifier is disclosed, leveraging an entailment classifier and optionally at least one of a pattern matching classifier and a trained machine learning (ML) classifier. Each of the different types of classifiers can be used to identify different categories of matches. For example, a pattern matching (e.g., regular expression) classifier may identify exact matches, an entailment classifier can obtain context-specific classifications based on likelihood of entailment to comparison data, and the SML classifier can obtain potential matches based on large-scale supervised training. The comparison data for the entailment classifier can be generated from small datasets, and can be readily updated without the need for retraining any machine learning models. Different types of classifiers can be processed using different logic to provide a user with the most appropriate response given a circumstance and given the user's open input.

30 Claims, 7 Drawing Sheets

(58) Field of Classification Search
CPC ...... G06F 40/205; G06F 16/353; G06F 16/35; G06F 40/284; G06F 40/216; G06F 16/93; G06F 18/214; G06F 18/24; G06F 18/217; G06F 16/285; G06F 40/253; G06F 40/58; G06F 16/3329; G06F 16/951; G06F 40/00; G06F 16/258; G06F 18/254; G06F 40/44; G06F 16/3344; G06F 17/18; G06F 40/295; G06F 40/169; G06F 18/24133; G06F 3/0482; G06F 40/126; G06F 40/47; G06F 16/334; G06F 18/2413; G06F 18/2431; G06F 21/552; G06F 21/6236; G06F 16/23; G06F 16/36; G06F 18/24323; G06F 2218/00; G06F 16/3347; G06F 18/22; G06F 18/241; G06F 3/04842; G06F 40/117; G06F 40/174; G06F 40/20; G06F 40/56; G06F 16/2237; G06F 16/338; G06F 18/21; G06F 18/2113; G06F 21/554; G06F 3/04817; G06F 40/211; G06F 11/2257; G06F 15/76; G06F 16/00; G06F 16/10; G06F 16/313; G06F 16/345; G06F 18/2155; G06F 3/0486; G06F 40/247; G06F 16/24578; G06F 17/15; G06F 18/2415; G06F 40/177; G06F 40/186; G06F 1/163; G06F 1/1698; G06F 11/3006; G06F 16/38; G06F 17/16; G06F 18/213; G06F 18/2148; G06F 2203/0331; G06F 3/014; G06F 3/017; G06F 3/041; G06F 40/268; G06F 8/36; G06F 11/0748; G06F 15/177; G06F 16/2282; G06F 16/355; G06F 18/2433; G06F 2201/86; G06F 3/011; G06F 40/10; G06F 40/151; G06F 40/274; G06F 11/008; G06F 11/0793; G06F 11/3476; G06F 11/3495; G06F 11/3684; G06F 16/252; G06F 16/335; G06F 16/367; G06F 18/00; G06F 18/2136; G06F 18/23; G06F 18/2411; G06F 18/285; G06F 40/103; G06F 11/079; G06F 16/81; G06F 16/90332; G06F 16/94; G06F 16/972; G06F 17/00; G06F 21/55; G06F 2218/12; G06F 2221/2129; G06F 30/15; G06F 40/232; G06F 40/42; G06F 9/453; G06F 11/0709; G06F 11/0751; G06F 11/3089; G06F 11/327; G06F 11/3688; G06F 12/0808; G06F 12/081; G06F 12/0815; G06F 12/084; G06F 12/0891; G06F 12/0897; G06F 12/1045; G06F 16/221; G06F 16/24526; G06F 16/288; G06F 16/31; G06F 16/82; G06F 16/9024; G06F 16/9535; G06F 16/954; G06F 18/10; G06F 18/2132; G06F 18/2178; G06F 18/2193; G06F 18/245; G06F 21/566; G06F 21/6245; G06F 2111/08; G06F 2212/1021; G06F 2212/6042; G06F 2212/684; G06F 2221/033; G06F 2221/034; G06F 3/167; G06F 30/20; G06F 40/143; G06F 40/154; G06F 40/194; G06F 40/242; G06F 40/40; G06F 9/45512; G06F 11/0733; G06F 16/16; G06F 16/243; G06F 16/245; G06F 16/30; G06F 16/3323; G06F 16/3335; G06F 16/3346; G06F 16/337; G06F 16/383; G06F 16/583; G06F 16/90335; G06F 16/90344; G06F 16/957; G06F 18/2414; G06F 18/29; G06F 18/40; G06F 21/6209; G06F 2119/20; G06F 3/0484; G06F 3/067; G06F 30/27; G06F 30/331; G06F 11/00; G06F 11/004; G06F 11/0727; G06F 11/2236; G06F 11/2263; G06F 11/3034; G06F 11/3041; G06F 11/3055; G06F 11/3065; G06F 11/3086; G06F 15/16; G06F 16/20; G06F 16/22; G06F 16/2438; G06F 16/2452; G06F 16/24522; G06F 16/2455; G06F 16/24573; G06F 16/248; G06F 16/287; G06F 16/358; G06F 16/437; G06F 16/685; G06F 16/71; G06F 16/783; G06F 16/7837; G06F 16/7847; G06F 16/958; G06F 18/2115; G06F 18/21345; G06F 18/2135; G06F 18/231; G06F 18/23213; G06F 18/24147; G06F 18/251; G06F 2009/4557; G06F 2009/45595; G06F 21/53; G06F 21/604; G06F 21/62; G06F 21/6218; G06F 2111/10; G06F 2218/08; G06F 3/013; G06F 3/0616; G06F 3/0653; G06F 3/0689; G06F 30/13; G06F 30/33; G06F 30/392; G06F 30/398; G06F 40/131; G06F 40/134; G06F 40/137; G06F 40/18; G06F 40/49; G06F 40/55; G06F 7/14; G06F 8/433; G06F 8/75; G06F 9/30003; G06F 9/30007; G06F 9/45558; G06F 11/006; G06F 11/0721; G06F 11/3013; G06F 11/302; G06F 11/3419; G06F 11/3452; G06F 11/3466; G06F 11/3612; G06F 11/3636; G06F 16/1734; G06F 16/1805; G06F 16/1824; G06F 16/211; G06F 16/2246; G06F 16/2255; G06F 16/24; G06F 16/2448; G06F 16/27; G06F 16/3325; G06F 16/34; G06F 16/43; G06F 16/58; G06F 16/90; G06F 16/90348; G06F 16/9537; G06F 17/17; G06F 18/211; G06F 18/2111; G06F 18/2134; G06F 18/24765; G06F 18/256; G06F 18/28; G06F 21/51; G06F 21/52; G06F 21/556; G06F 21/56; G06F 21/563; G06F 21/57; G06F 21/577; G06F 21/64; G06F 21/71; G06F 2119/06; G06F 2201/865; G06F 2218/02; G06F 2218/14; G06F 3/015; G06F 3/0481; G06F 3/04815; G06F 40/197; G06F 40/263; G06F 7/00; G06F 7/465; G06F 8/30; G06F 9/5005; G06F 9/5038; G06F 9/5061

See application file for complete search history.

(56) References Cited

U.S. PATENT DOCUMENTS

| | | | |
|---|---|---|---|
| 11,501,080 B2 * | 11/2022 | D'Souza | G06F 16/243 |
| 11,797,825 B2 * | 10/2023 | Hashimoto | G06F 40/216 |
| 2017/0193088 A1 * | 7/2017 | Boguraev | G06F 16/22 |
| 2020/0019642 A1 * | 1/2020 | Dua | G06F 16/3329 |
| 2020/0019863 A1 * | 1/2020 | Dua | G06F 16/313 |
| 2020/0227161 A1 * | 7/2020 | Hanson | G10L 15/22 |
| 2022/0318311 A1 * | 10/2022 | Wang | G06N 20/00 |
| 2022/0327407 A1 * | 10/2022 | Trischler | G06F 40/279 |
| 2022/0335219 A1 * | 10/2022 | Sengupta | G06F 16/9024 |
| 2023/0059946 A1 * | 2/2023 | Roy Chowdhury | G06F 40/30 |

* cited by examiner

OPEN INPUT CLASSIFIER WITH ENTAILMENT

PRIORITY CLAIM

The present disclosure claims priority to, and benefit of U.S. Provisional Application No. 63/277,918, filed Nov. 10, 2021. The contents of that application are hereby incorporated by reference.

TECHNICAL FIELD

The present disclosure relates to linguistic analysis generally and more specifically to using a combination of classifiers to provide accurate and efficient responses to open input.

BACKGROUND

Natural language processing (NLP) is used in many fields to provide a comfortable and relatable interface for various purposes. When a user communicates to a computer system via natural language, such as through text input (e.g., typing a message) or audio input (e.g., speaking a message), the computer system attempts to determine an intended meaning associated with the received input. For example, in the field of human psychology, artificial intelligence systems can use NLP to interact with the user and provide helpful tools, commentary, or other conversation with the user in a natural and comfortable fashion.

Some NLP systems make use of supervised machine learning classifiers that are trained on vast amounts of labeled natural language data. While such classifiers may be effective in a broad sense, these classifiers are ineffective at addressing classification in more narrow contexts, such as with respect to a specific subject matter for which vast amounts of labeled natural language data (e.g., amounts sufficient to suitably train a supervised machine learning classifier) may not be available. As a result, current NLP systems are unable to accurately and efficiently operate in narrow contexts, which can be especially detrimental in some NLP implementations, such as the providing of meaningful and effective psychological treatment.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, supplemented by this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

Embodiments of the present disclosure include a computer-implemented method comprising receiving an input phrase associated with a topic. The method further comprises accessing entailment comparison data. The entailment comparison data includes a plurality of example inputs associated with a plurality of topics. The plurality of topics includes the topic with which the input phrase is associated. The method further comprises generating classification data for the input phrase. Generating the classification data includes applying an entailment classifier to the input phrase using the entailment comparison data. The generated classification data is indicative of the topic. The method further comprises generating a response based at least on the generated classification data.

In some cases, the method further comprises presenting an input phrase prompt, wherein receiving the input phrase is in response to presenting the input phrase prompt, and wherein presenting the input phrase prompt includes presenting an input field for free text.

In some cases, applying the entailment classifier to the input phrase using the entailment comparison data includes generating, for each of the plurality of example inputs of the entailment comparison data, an entailment value indicative of whether the input phrase i) implies the respective example input; ii) contradicts the respective example input; or iii) is neutral with respect to the respective example input. In some cases, applying the entailment classifier to the input phrase further includes generating, for each entailment value, a confidence score. In some cases, applying the entailment classifier to the input phrase further includes identifying a set of one or more relevant example inputs from the plurality of example inputs based at least in part on the entailment values and the confidence scores; identifying a set of one or more matching topics from the plurality of topics based at least in part on the set of one or more relevant examples inputs; and generating entailment classification data based at least in part on the set of one or more matching topics. In some cases, applying the entailment classifier to the input phrase includes determining that the confidence score for each entailment value is below a threshold score; wherein generating the classification data further includes applying a supervised machine learning (SML) classifier to the input phrase to generate SML classification data in response to determining that the confidence score for each entailment value is below the threshold score, and wherein the generated classification data is based at least in part on the SML classification data.

In some cases, generating the classification data further includes applying the input phrase to at least one of a pattern matching classifier and a supervised machine learning (SML) classifier. In some cases, the SML classifier is a bidirectional encoder representations from transformers (BERT) classifier. In some cases, generating the classification data includes applying the pattern matching classifier to the input phrase to generate pattern matching classification data based on one or more preset patterns; and determining that the pattern matching classification data is indicative that the input phrase does not match the one or more preset patterns; wherein applying the entailment classifier to the input phrase generates entailment classification data, wherein applying the entailment classifier to the input phrase occurs in response to determining that the pattern matching classification data is indicative that the input phrase does not match the one or more preset patterns, wherein the entailment classification data is indicative of the topic, and wherein the generated classification data is based at least in part on the entailment classification data.

In some cases, generating the classification data includes generating entailment classification data in response to applying the entailment classifier to the input phrase; generating at least one of pattern matching classification data and SML classification data using the pattern matching classifier and SML classifier, respectively; and identifying the topic using the entailment classification data and the at least one of the pattern matching classification data and the SML classification data. In some cases, identifying the topic using the entailment classification data and the at least one of the pattern matching classification data and the SML classification data includes determining one or more possible topics using first data, wherein the first data is selected from the group consisting of the entailment classification data and the at least one of the pattern matching classification data and the SML classification data; and selecting the topic from the one or more possible topics using second data, wherein the second data is selected from the group consisting of the entailment classification data and the at least one of the pattern matching classification data and the SML classification data, and wherein the second data is different from the first data.

In some cases, generating the classification data further includes applying the input phrase to at least one of a pattern matching classifier and a supervised machine learning (SML) classifier to generate pattern matching classification data and SML classification data, respectively; and wherein accessing the comparison entailment data is based at least in part on at least one of the pattern matching classification data and the SML classification data.

In some cases, accessing the entailment comparison data includes selecting the entailment comparison data from a plurality of potential entailment comparison datasets, wherein each potential entailment comparison dataset is associated with a unique subject matter. In some cases, each of the plurality of topics of the entailment comparison data is associated with psychological therapy, and wherein generating the response facilitates delivery of psychological therapy to a user. In some cases, generating the classification data further includes applying the input phrase a supervised machine learning (SML) classifier that has been trained using training data that is not associated with psychological therapy Embodiments of the present disclosure include a system comprising one or more data processors; and a non-transitory computer-readable storage medium containing instructions which, when executed on the one or more data processors, cause the one or more data processors to perform the above method(s).

Embodiments of the present disclosure include a computer-program product tangibly embodied in a non-transitory machine-readable storage medium, including instructions configured to cause a data processing apparatus to perform the above method(s).

BRIEF DESCRIPTION OF THE DRAWINGS

The specification makes reference to the following appended figures, in which use of like reference numerals in different figures is intended to illustrate like or analogous components.

DETAILED DESCRIPTION

Figure 1:
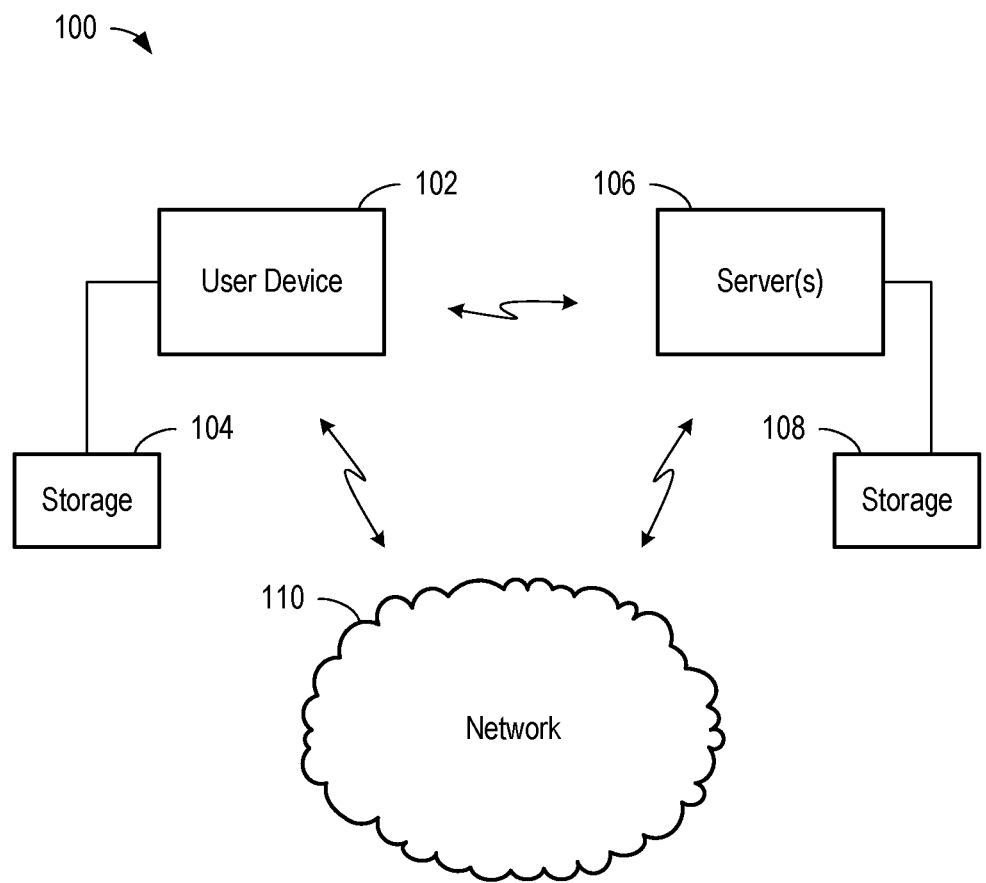
FIG. 1 is a schematic diagram depicting a computing environment, according to certain aspects of the present disclosure.

Certain aspects and features of the present disclosure relate to a natural language processing (NLP) system making use of an entailment classifier, and optionally at least one of a pattern matching classifier and a supervised machine learning (SML) classifier, to classify open inputs. Each of the different types of classifiers can be used to identify different categories of matches. For example, a pattern matching (e.g., regular expression) classifier may identify exact matches, an entailment classifier can obtain context-specific classifications based on likelihood of entailment to comparison data, and the SML classifier can obtain potential matches based on large-scale supervised training. The comparison data for the entailment classifier can be generated from small datasets, and can be readily updated without the need for retraining any machine learning models. Different types of classifiers can be processed using different logic to provide a user with the most appropriate response given a circumstance and given the user's open input. The NLP system can be used for various purposes, but may be especially useful in an automated therapy system, such as a chatbot therapy system.

Aspects and features of the present disclosure can be used in various environments and for various purposes. In some cases, the NLP system can be especially useful in an automated therapy system. In some cases, aspects and features of the present disclosure can be especially useful in human-computer interactions, such as artificial intelligence chat-based tools, commonly known as chatbots. In some cases, the present disclosure can be especially useful when used with chatbots used for automated therapy, such as the monitoring and/or treatment of mental health disorders via an automated therapy chatbot. In such cases, it can be especially important to accurately and quickly identify specific categories of information from a user's open input. For example, the chatbot may be able to identify a problem on which the user would like to work and then tailor future response or workflows to that problem. Similarly, the chatbot may be able to identify categories or types of thoughts associated with a user's open input, then tailor future responses or workflows to those categories or types of thoughts. Further, categorizing information from a user's open input can be useful to determine the efficacy of the automated therapy. For example, if a goal of therapy is to spend less time worrying about a particular problem, the chatbot may be able to detect a gradual decrease in worrying about that problem over time via the aspects and features disclosed herein.

With respect to monitoring and/or treatment of mental health disorders, the NLP system disclosed herein can be especially effective since it can be used with and be easily updated for narrow, yet important, subject matter or other contexts. For example, treatment of postpartum depression issues can be very important, but NLP in this context may be difficult since the amount of labeled data available for training a supervised machine learning algorithm may not be sufficient to sufficiently train the algorithm. However, according to certain aspects of the present disclosure, even small amounts of labeled data can be leveraged to generate entailment comparison data, which can be used by an entailment classifier to classify input phrases. Further, as new labeled data becomes available, the entailment comparison data can be updated without ever needing to retrain the entailment classifier. Thus, certain aspects of the present disclosure are especially effective at rapidly (e.g., without expending the time or resources to retrain a machine learning algorithm), and optionally dynamically, deploying updates to a classification system of an NLP system.

In cases where a chatbot is used, inputs (e.g., input phrases) are normally received in the form of text selected from a list or entered into a field, although that need not always be the case. For example, in some cases, individuals can speak or dictate to the chatbot. As used herein, the term open input can refer to free text entered into a field or otherwise provided to the chatbot. Free text can include textual input that is without restraint or with minimal restraint (e.g., not a selection of preset options, but provided using the user's own language).

While described with reference to a chatbot in many places herein, certain aspects and features of the present disclosure can be used for other purposes. For example, certain aspects and features of the present disclosure can also be used to identify problems or categories of thought in human-human interactions, such as text-based or audio-based communications between individuals locally or remotely. For example, a therapist treating a patient may make use of a system that automatically detects the patient's interactions to automatically detect what sorts of problems the patient wishes to address and/or what sorts of thoughts the patient is evidencing. The automated system may use that automatic detection in various ways, such as to generate a log file to which the therapist can refer back at a later time, or to provide relevant notifications to the therapist (e.g., identifying a recommended technique for addressing the patient's specific problem, providing an indication of past instances of the same types of thoughts, or the like).

While many applications of the aspects and features of the present disclosure are especially useful for automatic classification in realtime, that need not always be the case. In some cases, an input phrase can be stored for later processing, only being processed at a later time to identify problems, types of thoughts, or other classifications that are associated with when the input phrase was supplied. In such cases, various actions, such as asking a user about whether or not the problem is still persisting, can be performed.

An individual can provide an input phrase, such as via open text (e.g., written free text) entry in a chat box, by selecting a text entry, by speaking words aloud (e.g., verbal free text), or otherwise. The term input phrase is inclusive of any suitable collection of inputs that conveys linguistic meaning, such as a single word, multiple words, a single sentence, multiple sentences, or even symbols (e.g., emoticons and the like). The input phrase can be pre-processed as necessary to achieve a standard type of input for the classifiers (e.g., an audio signal can be processed through a speech-to-text processor to generate corresponding text).

The input phrase can be processed by at least an entailment classifier, and optionally a pattern matching classifier and/or a supervised machine learning classifier, to identify a topic. As used herein, the term topic can include any suitable classification, such as a problem (e.g., a problem on which the user wishes to work), a subject (e.g., a subject about which the user is talking), a category (e.g., a category into which an input phrase falls), or a type of thought (e.g., negative thoughts, self-deprecating thoughts, self-harming thoughts, positive thoughts, thankful thoughts, etc.).

In some cases, the input phrase can be processed by two or more of a pattern matching classifier, an entailment classifier, and a trained machine learning classifier (optionally sequentially in that order) to determine if at least one classifier returns a classification output indicative of one or more topics associated with the input phrase. If at least one of (or optionally at least two of or optionally all three of) the classifiers returns a classification output, the classification output(s) can be used to generate a response, such as by following a particular workflow associated with the identified topic(s), requesting the user to select between particular workflows based on the identified topic(s), or providing a responsive phrase in response to the identified topic(s).

As an example of the classification process, if a chatbot asks a question such as "What would you like to work on today?", the user's response can determine the chatbot's next steps. If the user says "I'd like to work on feeling depressed about nursing my child," the pattern matching classifier may use regular expressions to identify known phrases, such as "feeling depressed about nursing," then generate a classification output (e.g., pattern matching classification data) indicative that the problem on which the user would like to work is presumed to be related to post-partum depression (PPD), and more specifically, PPD related to nursing. Because of the high speed of the pattern matching classifier, it may finish its classification more quickly than other classifiers, allowing for the chatbot to proceed more quickly.

Likewise, if the user says "Can you help teach my baby how to latch?!", the entailment classifier may process the phrase to generate a classification output (e.g., entailment classification data) identifying one or more topics associated with the input phrase. Specifically, the entailment classifier can use compare the input phrase to many example phrases in an entailment comparison dataset to determine whether the input phrase entails, contradicts, or is neutral with respect to each example phrase. The entailment comparison dataset can include a topic, which can be unique or non-unique, associated with each example phrase. Thus, the entailment classifier can identify a topic by determining that the input phrase entails the example phrase associated with that topic. The entailment classifier can output classification data that includes a single topic, a set of topics, or other results generated by the entailment classifier (e.g., an entailment mapping, as disclosed herein).

The entailment classifier can be a machine learning algorithm (e.g., machine learning model) that has been trained to identify a positive or negative, or optionally neutral, entailment between a first phrase and a second phrase. The entailment classifier need not be trained on for a narrow subject matter or context. Rather, the entailment classifier can be trained using any available inputs. A positive entailment indicates that the input phrase is consistent with or entails the example phrase (e.g., an "I'm ecstatic!" input phrase can have a positive entailment with an "I am happy" example phrase); a negative entailment indicates that the input phrase is inconsistent with or contradicts the example phrase (e.g., an "I'm ecstatic!" input phrase can have a negative entailment with an "I'm feeling sad" example phrase); and a neutral entailment indicates that the input phrase is neither consistent with nor inconsistent with the potential category (e.g., an "I'm ecstatic!" input phrase can have a neutral entailment with an "It's colder today than yesterday" example phrase). In some cases, topics that would be classified with a neutral entailment can be ignored. As the entailment classifier processes each of the example phrases within an entailment comparison dataset, it can generate an entailment mapping that includes the entailment value, and optionally a confidence score, for that example phrase. An entailment value is indicative of the input phrase entailing, contradicting, or being neutral with respect to an example phrase. The confidence score can be an indication of how confident the entailment classifier is that the entailment value is correct. For example, the entailment classifier may indicate that the input phrase is associated with both Example Phrase A and Example Phrase B with positive entailment, but the confidence score of Example Phrase A may be 33% while the confidence score of Example Phrase B may be 95%. In such an example, the system may proceed using Example Phrase B (e.g., the topic associated with Example Phrase B) alone, or can proceed using both Example Phrase A and Example Phrase B (e.g., the topics associated with Example Phrase A and Example Phrase B), but placing more emphasis on Example Phrase B (e.g., the topic associated with Example Phrase B).

The SML classifier can be used to classify input phrases more generally. In some cases, the SML classifier is used when no classification were determined by the entailment classifier or pattern matching classifier, or for which insufficient classification was determined (e.g., additional topics were identified in the SML classifier in addition to any identified by one or more other classifiers). The SML classifier can process the input phrase to generate a classification output (e.g., SML classification data). The SML classification data can include one or more possible classifications, optionally with a confidence score provided for each possible classification.

In some cases, the system can request confirmation (e.g., from the user) that one or more classifications (e.g., identified topics) are correct. The confirmation can be stored, optionally along with the input phrase and/or any classification outputs, and later used to improve future classification. For example, a positive confirmation indicating that an input phrase is indeed associated with the identified topic can be used to manually or automatically update entailment comparison data (e.g., by adding the input phrase and identified topic as a new example phrase and associated topic). In some cases, the confirmation can be used to direct further actions of the system, such as to direct the type of response to generate or other actions to take. In some cases, a confirmation request can be a request to confirm that a particular topic is correct (e.g., is associated with the input phrase or what the user desires). In some cases, a confirmation request can include a list of two or more potential topics, allowing the user to select as correct one of the potential topics, or optionally multiple potential topics. In some cases, if a topic is indicated as incorrect, a follow-up prompt can be presented to obtain more information about why the identified topic was indicated as incorrect. In some cases, presenting a follow-up prompt can include using the input phrase, such as presenting the input phrase and asking the individual why the input phrase is not indicative of the identified topic. In some cases, responses to a follow-up prompt can be used to further improve one or more of the classifiers, such as to further improve the pattern matching classifier and/or further train the entailment classifier or SML classifier.

In some cases, an entailment classifier and one or more of a pattern matching classifier and an SML classifier can be used sequentially in a cascading fashion. As used herein, the term cascading fashion when used with respect to classifiers is indicative that the output of at least one classifier can be used as an input to or a trigger for another classifier. For example, the fastest classifier (e.g., the pattern matching classifier) may process the input phrase first. If a positive classification is made (e.g., one or more topics are identified, optionally with a confidence score above a threshold value), the process can simply move to using the identified one or more topics to generate a response. If a negative classification is made (e.g., no topics are identified and/or the confidence scores for any identified topics are below a threshold value), the process may proceed to the next classifier in line. If the next classifier renders a positive classification, it can be used to generate a response. If the next classifier renders a negative classification, the process can continue to the third classifier. The results of the third classifier can then be used to generate a response. For example, if the last classifier in the sequence renders a positive classification, the one or more identified topics can be used to generate the response, but if the last classifier renders a negative classification, the generated response can be indicative that no topic was identified, such as by requesting further information or an alternate input phrase (e.g., "I am unsure what you mean. Please try telling me again, but in a different way.").

In some cases, if a negative classification is made, whether when classifiers are used in a cascading fashion or not, the system can automatically adjust any confidence threshold values (e.g., threshold scores) to attempt to obtain a positive classification.

In some cases, an entailment classifier and one or more of a pattern matching classifier and an SML classifier can be used simultaneously (e.g., starting at the same time, such as running in parallel) or sequentially in a non-cascading fashion (e.g., starting at different times, such as sequentially, but without the output of one classifier being used as an input to or trigger for another classifier). The results of running classifiers simultaneously may be the same as running the classifiers sequentially in a non-cascading fashion, with the latter being useful when processing power is limited. In an example, an input phrase can be provided to all classifiers running at the same time (e.g., running in parallel). In some cases, once one of the classifiers returns a positive classification, a response can be generated using the one or more identified topics. In some cases, once at least a threshold number of classifiers (e.g., all classifiers) have finished running (e.g., returning either a positive classification or a negative classification), a response can be generated using the one or more identified topics.

The use of an entailment classifier as disclosed herein, especially in conjunction with one or more of a pattern matching classifier and a trained SML classifier, has been found to be especially useful for classification of the myriad of problems and thoughts brought up during a therapy session (e.g., a psychological therapy session, such as via a chatbot). In such cases, it can be important to leverage the unique advantages of each type of classifier. The pattern matching classifier can be useful to classify known or expected text matches; the SML classifier can be especially useful for categorizing a large variety of inputs; and the entailment classifier can be especially useful for its ability to categorize more specific topics than possible with the SML classifier.

Additionally, the use of an entailment classifier in conjunction with one or more of a pattern matching classifier and a trained SML classifier can provide a number of benefits in the field of chatbot technology and natural language processing, such as improvements to speed, accuracy, sensitivity, specificity, and others. For example, the entailment classifier can help capture more specific topics with better granularity, the pattern matching classifier can help capture very specific topics very quickly, and the SML classifier can help capture topics that might not be otherwise captured by an entailment classifier or pattern matching classifier.

Such improvements can be important, especially in the field of chatbot technology, and even more so in the field of automated therapy (e.g., automated chatbot therapy). In the field of chatbot technology, certain aspects and features of the present disclosure can make the chatbot's responses more accurate and more timely (e.g., faster) than existing chatbots, especially by leveraging the subject-matter granularity afforded by the entailment classifier. The speed, accuracy, and granularity of the chatbot can help the chatbot appear more human, help the chatbot become easier to talk with, help the chatbot hone in on the right subject matter, and help build and maintain the user's trust in the chatbot. In the field of automated therapy, the accuracy, timeliness, and granularity is especially important in building and maintaining the therapeutic alliance and human-computer relationship so important in providing effective and efficient therapy. Use of certain aspects of the present disclosure result in more effective automated chatbot therapy, which can further open the automated chatbot therapy system to helping provide therapy over a wider range of topics.

Certain aspects of the present disclosure, including the use of an entailment classifier alone or combined with at least one of a pattern matching classifier (e.g., RegEx classifier) and an SML classifier (e.g., a BERT classifier), provide specific improvements to the technological process of interpreting user input and generating appropriate responses in natural language processing, especially with respect to chatbots and automated psychological therapy, and especially with respect to fields where subject-matter granularity is important. For example, the entailment classifier can leverage entailment comparison data generated to identify specific context-relevant topics that i) would not be classified at all or with as much granularity by an SML classifier; and ii) an individual setting up a pattern matching classifier might not have predicted; all while the pattern matching classifier ensures certain known or predicted phrases or inputs are properly classified even if they would not trigger any of the other classifiers, and the SML classifier ensures at least some of the phrases or inputs that would not otherwise be classified by another classifier can still be classified and used.

A pattern matching classifier can be any suitable classifier that uses matching criteria to identify whether or not the input phrase fits the matching criteria. In some cases, simple pattern matching classifiers can include find or search functions that simply determine whether or not a certain word or collection of words is present in the input phrase. In some cases, more complex pattern matching classifiers can be used, such as a regular expression (RegEx) classifier. In such cases, the matching criteria can be the regular expressions used to determine whether or not the input phrase first matches the set of regular expressions. For example, a regular expression can be "\b(trouble|problem)\W+(?: \w+\W+){1,15}?(\w+){0,}(latch|latching|latches)" and can search for instances of words containing "trouble" or "problem" within fifteen words of "latch," "latching," or "latches." A set of regular expressions can include one or more inclusionary regular expressions and/or one or more exclusionary regular expressions. In some cases, use of a RegEx classifier has been especially useful, although any suitable pattern matching classifier may be used. The pattern matching classifier can be a classifier that does not use a trained machine learning model.

A trained machine learning (ML) classifier is any suitable classifier that uses machine learning to train the classifier, such as using supervised or unsupervised training. An ML classifier trained using supervised training can be referred to as an SML classifier. While an SML classifier may be especially useful in some circumstances, in some cases, instances reciting use of an SML classifier herein may be replaced with an ML classifier as appropriate. An ML classifier can be a machine learning model. Any suitable ML classifier can be used, such as a neural network classifier or deep neural network classifier. In some cases, a recurrent neural network (RNN), optionally with a long short-term memory (LSTM) architecture, can be used. In some cases, the machine learning model can be a transformer-based model, which can process a full input phrase at a time, rather than a RNN, which may process individual tokens of an input phrase one-at-a-time. In some cases, the trained machine learning classifier can be a model that is pretrained for use with language, and then further trained or fine-tuned specifically for identification of psychological therapy topics. Examples of pretrained transformer-based models include a Generative Pretrained Transformer 2 (GPT-2) model and a Bidirectional Encoder Representations from Transformers (BERT) model. Training (e.g., initial training or further training) and/or fine-tuning can include using training data that includes a set of input phrases comprising a subset of input phrases associated with various psychological therapy topics. In some cases, use of a BERT classifier has been especially useful, although any suitable trained machine learning classifier may be used. In some cases, the supervised SML classifier is a BERT classifier or other classifier that has been trained using supervised machine learning. In some cases, the SML classifier is pretrained for use with one or more languages, although not with psychological-therapy-specific data. In some cases, the SML classifier can be trained using training data designed to capture a large collection of inputs that would otherwise not be captured by the pattern matching classifier and/or the entailment classifier.

An entailment classifier is a classifier that uses a trained model to compare an input phrase with each example phrase of an entailment comparison dataset to determine whether the input phrase i) implies the example phrase; ii) is not related to the example phrase; or iii) contradicts the example phrase. The entailment classifier can make use of machine learning or a machine learning model. The entailment classifier can be trained on labeled, context-agnostic training data, although that need not always be the case. Once trained, the entailment classifier can be used with any number of entailment comparison datasets to provide classification across any number of contexts (e.g., across any number of subject matters). In some cases, the entailment comparison datasets can include numerous example phrases and topics (e.g., categories, such as problems or thoughts) associated with psychological therapy generally, or a specific area of psychological therapy (e.g., PPD). For example, an automated therapy chatbot intended for use to treat, among other issues, PPD may make use of entailment comparison data containing example phrases and topics associated with PPD, such as phrases or topics relating to problems latching or nursing, feeling overwhelmed, difficulty bonding with the child, thoughts of self-harm, thoughts of harming the child, postpartum psychosis, paternal postpartum depression, and the like. In some cases, the entailment comparison data can be updated by adding or removing entries (e.g., example phrase associations with respective topics), which can optionally be performed automatically. Thus, the entailment classifier can be updated without needing to retrain its machine learning model, which can be a long and computationally expensive process. Thus, the entailment classifier can be updated much faster and more easily than the SML classifier, which can further help the entailment classifier identify more specific and up-to-date topics. The output from the entailment classifier can be one or more topics, or can be an entailment mapping, which can include i) one or more example phrases; ii) one or more entailment values; iii) one or more confidence scores; iv) one or more topics; or v) any combination of i-iv.

In some cases, the classification output of one or more classifiers can be used to facilitate training of another of the classifiers. For example, if a pattern matching classifier outputs a negative classification (e.g., does not find a match), the input phrase can be passed to the entailment classifier. Thus, the entailment classifier might only receive a subset of the full set of input phrases, namely those input phrases for which the pattern matching classifier has no matches. This subset of the full set of input phrases can be used to generate a more effective or efficient entailment comparison dataset, such as by avoiding (e.g., not needing to store) any example phrases that would automatically be matched by the pattern matching classifier. The SML classifier can be trained (e.g., further trained or retrained) similarly, such as using input phrases that were not matched by the pattern matching classifier and/or the entailment classifier. In some cases, however, the SML classifier can be otherwise further trained or retrained, such as using a different training set of data and/or using the full set of input phrases.

In some cases, the classification output of one or more classifiers can be used to validate the classification of another classifier. For example, an SML classifier may classify an input phrase as being associated with Topic A with a confidence score of 80% and Topic B with a confidence score of 75%. An entailment classifier may classify the same input phrase, indicating that the phrase contradicts the example phrase associated with Topic A with a confidence score of 50%, but implies the example phrase associated with Topic B with a confidence score of 93%. Therefore, the system may use the entailment classification output to determine that the best topic to use from the SML classifier output is Topic B.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may not be drawn to scale.

FIG. 1 is a schematic diagram depicting a computing environment 100 according to certain aspects of the present disclosure. The environment 100 can be located in a single physical location or can be distributed about multiple physical locations. Environment 100 can be used to implement an NLP system, such as a chatbot or automated therapy system, such as one being used to receive input phrases, process the input phrases to identify a topic (e.g., a problem or thought), and respond accordingly, such as described in further detail herein. Environment 100 is an example of a suitable environment for implementing the system, although other environments can be used instead.

Environment 100 can include a user device 102 and a server 106, although in some cases one of these devices may not be included. For example, some environments contain only a user device 102. In some cases, multiple user devices 102 can be used. In some cases, other devices can be used. When multiple devices are used, each device can be communicatively coupled together, such as via a direct connection (e.g., a wired connection, such as a universal serial bus (USB) connection, or a wireless connection, such as a Bluetooth connection) or via network 110. Network 110 can be any suitable network, such as a local area network, a wide area network, a cloud, or the Internet.

An individual can provide an input phrase to the system, which can then process the input phrase to identify a topic. The system can be implemented on a single device (e.g., on user device 102) or can be implemented across multiple devices (e.g., any combination of user device 102 and sever(s) 106).

The system can process the input phrase by applying an entailment classifier, and optionally at least one of a pattern matching classifier and a trained machine learning classifier. Each classifier can have classifier parameters that define how the classifier functions. In an example, the pattern matching classifier's classifier parameters can include matching criteria (e.g., a set of regular expressions containing one or more regular expressions), which can be configured to trigger whenever certain trigger phrases (e.g., triggering words, triggering collections of words, triggering symbols, triggering patterns of words, or the like) are present (e.g., matched) in the input phrase. In another example, the trained machine learning classifier's classifier parameters can include a model (e.g., a transformer model) that has already been trained for a given language. In another example, the entailment classifier's classifier parameters can include a model (e.g., a trained entailment model) and one or more entailment comparison datasets (e.g., datasets of example phrases and associated topics) for particular contexts (e.g., particular aspects or subjects of psychological therapy).

Upon identifying the correct topic, the system can generate an appropriate response, such as by taking an action or generating a textual response (e.g., a verbal response or a visual response) or other stimulus.

A user device 102 can act as a primary mode of interaction for one or more individuals to provide input phrases; receive responses, prompts, and information; and otherwise interact with the system. Examples of user device 102 include any suitable computing device, such as a personal computer, a smartphone, a tablet computer, a smartwatch, a computerized audio recorder, or the like. User device 102 can be operatively coupled to storage 104 to store data associated with applications and processes running on the user device 102. User device 102 can include any combination of input/output (I/O) devices that may be suitable for interacting with the system, such as a keyboard, a mouse, a display, a touchscreen, a microphone, a speaker, an inertial measurement unit (IMU), a haptic feedback device, or other such devices.

One or more servers 106 can be used to process input phrases, such as input phrases received from user device 102 via network 110, by receiving the input phrase, classifying it to identify one or more topics, and take further action (e.g., generate a response). In some cases, server(s) 106 can receive classifier data and/or one or more identified topics (e.g., from a user device 102), which can then be used by the server(s) 106 to facilitate generating the response.

In some cases, server(s) 106 can be used to receive information that can be used to update one or more of the classifiers. For example, server(s) 106 can receive confirmation information indicating that a particular input phrase was correctly or incorrectly classified, optionally including the input phrase itself, the one or more topics being confirmed, the one or more classifiers used to generate the classification, information associated with the user making the confirmation, and the like. This information can be used to automatically or manually update classifier parameters and improve one or more of the classifiers. For example, if the pattern matching classifier regularly identifies a particular phrase as indicative of PPD, but individuals regularly provide confirmation responses that indicate the classification is incorrect, the matching criteria of the pattern matching classifier can be modified to no longer trigger based on the particular phrase. In another example, confirmation responses associated with an input phrase can be used to improve the entailment comparison datasets of the entailment classifier and/or improve training of the SML classifier. In some cases, confirmation information associated with a given classifier can help improve calculation of the particular classifier's operational statistics, including the classifier's accuracy, sensitivity, specificity, precision, and/or F-score. Calculation of such operational statistics can inform the need for updates or further training.

In some cases, classifying an input phrase can occur directly on the user device 102, such as using classifiers and/or classifier parameters stored in storage 104. In some cases, classifying an input phrase can occur at server(s) 106, with the user device 102 providing the input phrase to the server(s) 106. In some cases, classifying an input phrase can be split, with one or more classifiers (e.g., the pattern matching classifier) running on the user device 102, and one or more other classifiers (e.g., the entailment classifier) running on the server(s) 106. In such cases, the user device 102 may be able to handle classification locally if the first classifier returns a positive classification. Storage 104 or storage 108 can be used to store code used to implement one or more classifiers, as well as any classifier parameters. For example, in some cases, the entailment comparison datasets used with the entailment classifier can be stored in storage 108.

Figure 2:
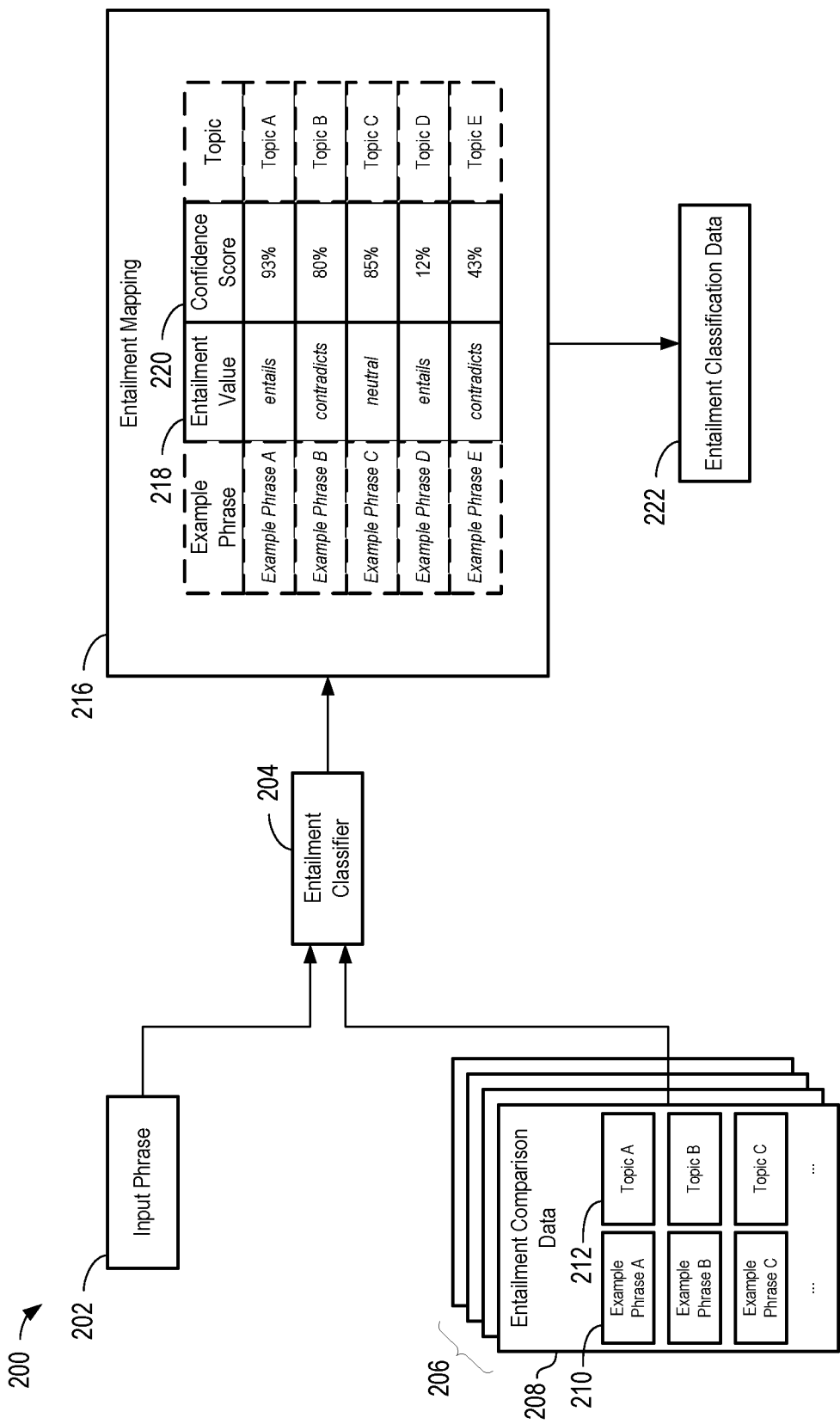
FIG. 2 is a schematic diagram of an entailment classification system, according to certain aspects of the present disclosure

FIG. 2 is a schematic diagram of an entailment classification system 200, according to certain aspects of the present disclosure. The entailment classification system 200 can be incorporated into any suitable NLP system, such as the NLP system described with reference to environment 100 of FIG. 1.

Input phrase 202 can be a phrase to be classified. The input phrase 202 can be received by any suitable technique, such as via text entry, or as otherwise described herein, such as with reference to block 302 of FIG. 3. For example, input phrase 202 can be initially provided via user input on a user device (e.g., user device 102 of FIG. 1), such as by a user typing into a chat system.

The entailment classification system 200 can include a set of entailment comparison datasets 206. In some cases, the set of entailment comparison datasets 206 includes only a single entailment comparison dataset, although in some cases multiple entailment comparison datasets can be used. As depicted in FIG. 2, the set of entailment comparison datasets 206 includes four entailment comparison datasets, although only a single dataset is being used. Specifically, entailment comparison data 208 (e.g., the data of a single entailment comparison dataset) is used.

Each entailment comparison dataset 206 can include multiple example phrases 210 (e.g., Example Phrase A, Example Phrase B, Example Phrase C, and the like) that are associated with respective topics 212. Each example phrase 210 is associated with a topic 212, although not necessarily uniquely. For example, in some cases, multiple examples phrases 210 (e.g., Example Phrase A and Example Phrase G) can be associated with the same topic (e.g., Topic A). Each example phrase 210 can be a phrase used to indicate its respective topic. For example, a phrase of "I don't have any appetite" or a phrase of "I couldn't finish my dinner tonight" may both indicate a topic of "diminished appetite."

In some cases, entailment comparison data 208 can be associated with a particular subject matter. For example, entailment comparison data 208 may be associated with postpartum depression. In such cases, the various example phrases 210 and topics 212 within the entailment comparison data 208 may be extracted from collected data that is specific to postpartum depression. For example, the available collected data for postpartum depression (e.g., labeled sets of input phrases and associated topics associated with postpartum depression) may be used to provide a number of input phrases that are associated with different topics related to postpartum depression. In some cases, the set of entailment comparison datasets 206 can include multiple entailment comparison datasets, each with their own subject matter or context. Thus, while the same example phrase may appear in multiple entailment comparison datasets, the topic associated with the example phrase may be subject-matter-dependent. As an example, the example phrase of "He won't eat anything" may relate to a topic of "breastfeeding" in an entailment comparison dataset associated with postpartum depression, but may relate to a topic of "gastrointestinal illness" in an entailment comparison dataset associated with pet care. In some cases, a given entailment comparison dataset to use can be fixed (e.g., a postpartum depression treating chatbot may only use an entailment comparison dataset associated with postpartum depression), can be pre-selected (e.g., a user may enter a postpartum depression module of a chartbot, in which case an entailment comparison dataset associated with postpartum depression would be used for the duration of that module, whereas a different entailment comparison dataset may be used for a different module), or can be automatically selected (e.g., depending on a detected context or the output of another classifier, such as a pattern matching classifier or a SML classifier). In some cases, multiple entailment comparison datasets can be selected and used simultaneously, with any overlapping example phrases being removed, ignored, manually resolved, or automatically resolved (e.g., based on a detected context or other classification of the input phrase). In some cases, such as when the entailment classification system 200 is being used as a chatbot for psychological therapy, each of the set of entailment comparison datasets 206 can be associated with different subjects within the field of psychological therapy.

The entailment classifier 204 is a classifier that uses the input phrase 202 and the selected entailment comparison data 208 to generate entailment classification data 222 (e.g., via generating an entailment mapping 216). The entailment classifier 204 can be a model (e.g., entailment model), such as a machine learning model, that has been pre-trained to determine whether or not a first phrase (e.g., the input phrase 202) entails a second phrase (e.g., each example phrase 210). The entailment classifier 204 need not be pre-trained using training data that is specific to any subjects of the set of entailment comparison datasets 206. For example, when the available collected data for a given subject matter is low, the entailment classifier 204 can be pre-trained using a different training dataset, while the entailment comparison data 208 can be generated using the available collected data for the subject matter.

The entailment classifier 204 can generate an entailment mapping 216. The entailment mapping can include an entailment value 218, and optionally a confidence score 220, for each of the example phrases 210 of the entailment comparison data 208. In some cases, however, the entailment mapping 216 may ignore any example phrases where the entailment value is neutral, where the entailment value is contradicts, or where the confidence score is below a threshold score.

Each entailment value 218 indicates whether the input phrase 202 entails, contradicts, or is neutral with respect to the respective example phrase. The respective confidence score 220 is an indication of the degree of confidence of that entailment value 218. As depicted in FIG. 2, the input phrase 202 is shown as entailing Example Phrase A with a confidence score of 93%, whereas the input phrase 202 contradicts Example Phrase B and is neutral with respect to Example Phrase C. In some cases, the highest confidence score or a number of highest confidence scores (e.g., top three scores, all scores above a threshold score, etc.) can be used to generate the entailment classification data 222.

In some cases, the entailment classification data 222 includes the entailment mapping 216 or a partial version of the entailment mapping 216. In some cases, the entailment classification data 222 includes one or more topics that are matched based on the entailment mapping 216. For example, as depicted in FIG. 2, the entailment classification data 222 may be an indication of Topic A, since the input phrase 202 was found to entail Example Phrase A with the highest confidence score.

Figure 3:
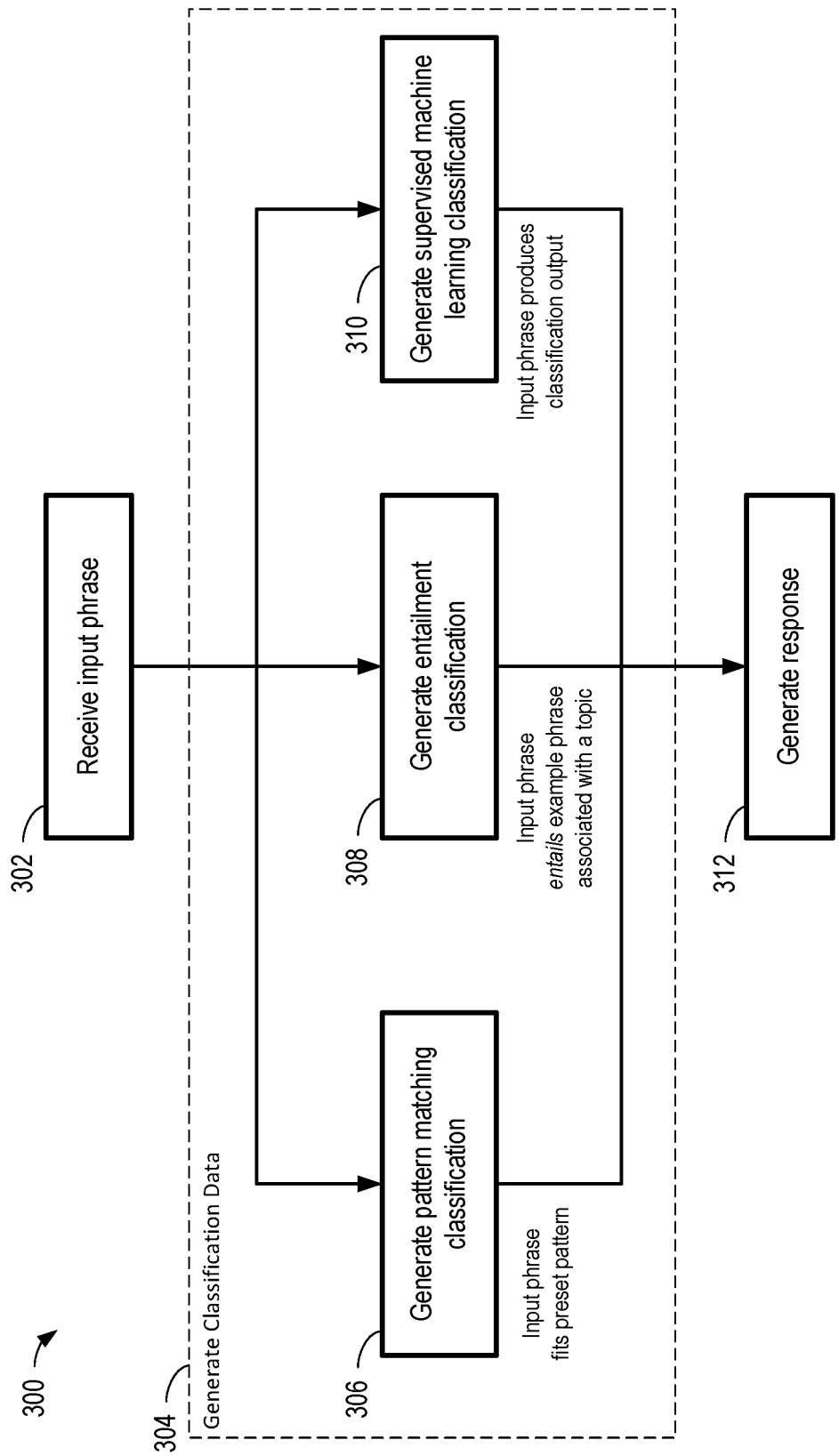
FIG. 3 is a flowchart depicting a process for classifying an input phrase and generating a response, according to certain aspects of the present disclosure.

FIG. 3 is a flowchart depicting a process 300 for classifying an input phrase and generating a response, according to certain aspects of the present disclosure. Process 300 can be performed using any suitable NLP system, such as the NLP system described with reference to environment 100 of FIG. 1. For example, process 300 can be performed by one or more of the user device 102 and the server(s) 106 of FIG. 1.

At block 302, an input phrase is received. The input phrase can be received by any suitable technique, such as via text entry (e.g., in a smartphone app or on a website), by audio entry (e.g., by passing live or recorded voice through a speech-to-text interpreter), by selection (e.g., by selecting one of a set of potential responses), or otherwise. In some cases, receiving the input phrase at block 302 can include receiving free text input. The input phrase can be optionally stored. In some cases, receiving the input phrase at block 302 can optionally include preprocessing the input phrase, such as to normalize the text input, correct spelling mistakes, expand abbreviations or abbreviated phrasing, translate to another language (e.g., a language associated with one or more of the classifiers, such as a language used to train one or more classifiers, a language used to establish pattern matching criteria, or a language used to generate entailment comparison datasets), or the like.

At block 304, classification data is generated from the received input phrase. Generating classification data at block 304 can include classifying the input phrase to identify one or more topics (e.g., categories, problems, thoughts, etc.) that are associated with the input phrase. The classification data that is output from block 304 can include a set of one or more identified topics. In some cases, the classification output can further include additional information associated with the classification, such as the type of one or more classifiers used to identify the topic, one or more confidence scores associated with the topic, the number of classifiers that agree that the topic is associated with the input phrase, or the like.

Generating classification data at block 304 can include using one or more different types of classifiers. In some cases, generating classification data at block 304 includes using at least an entailment classifier, and optionally at least one of a pattern matching classifier and an SML classifier.

At block 306, a pattern matching classification can be generated using a pattern matching classifier, such as disclosed herein. For example, a RegEx classifier can be used to identify one or more topics based on the input phrase. The output from block 306 (e.g., classification data) can include a list of one or more topics that are associated with the input phrase fitting one of the pattern matching criteria (e.g., regular expressions) established for the RegEx classifier.

At block 308, an entailment classification can be generated using an entailment classifier, such as described with respect to entailment classification system 200 of FIG. 2. For example, an entailment classifier can leverage an entailment comparison dataset generated using context-specific training data (e.g., training data associated with psychological therapy or a specific field of psychological therapy) to generate entailment classification data. The entailment classification data can include one or more topics, or optionally an entailment mapping, which can include a list of one or more topics, optionally including confidence score(s), and optionally including entailment values (e.g., whether or not the input phrase implies (e.g., entails) or contradicts (or is neutral with respect to) the example phrase associated with the topic).

At block 310, an SML classification can be generated using an SML classifier, such as disclosed herein. For example, a BERT classifier can be used to generate the SML classification data. This SML classification data can include a list of one or more topics, optionally including confidence score(s).

In some cases, the classification data from each of the classifiers used at block 304 can be output separately. For example, when three classifiers are used, the output can indicate the classification output from each classifier separately. In other cases, the classification data from one or more of the classifiers can be used with one or more other classifiers to generate a final classification output. For example, the final classification output can be the top x number (e.g., top one, top three, etc.) of topics by confidence score (e.g., with each topic of the pattern matching classifier automatically receiving a maximum confidence score). In another example, the final classification output can be any topics that have a confidence score above a threshold value. In another example, classification data from one or more classifiers can be used to confirm the classification data from another classifier, and then the confirmed classification data can be used as the final classification output.

In some cases, one or more of the classifiers may provide a classification output (e.g., classification data) indicative that no topics were identified. For example, if the pattern matching classifier identified no topics, that information can be further used, such as in the confirmation of one or more topics from another classifier or the generation of a response.

As described in further detail herein, in some cases generating the classification data at block 304 can include presenting one or more potential topics to a user and receiving user confirmation, which can be used to identify at least one of the one or more potential topics that should be used going forward.

At block 312, a response can be generated using the classification data generated from block 304. Generating the response can include determining a response using the one or more topics identified by block 304. In some cases, generating the response can include presenting the response (e.g., displaying response or audibly playing the response) to the user. In some cases, generating the response can include transmitting the response to a user device such that the user device will present the response to the user.

Process 300 is depicted with a certain arrangement of blocks, however in other cases, these blocks can be performed in different orders, with additional blocks, and/or some blocks removed. For example, in some cases, block 310 is removed. In some cases, block 306 is removed. In some cases, block 306 can be performed before either of block 308 or block 310.

Figure 4:
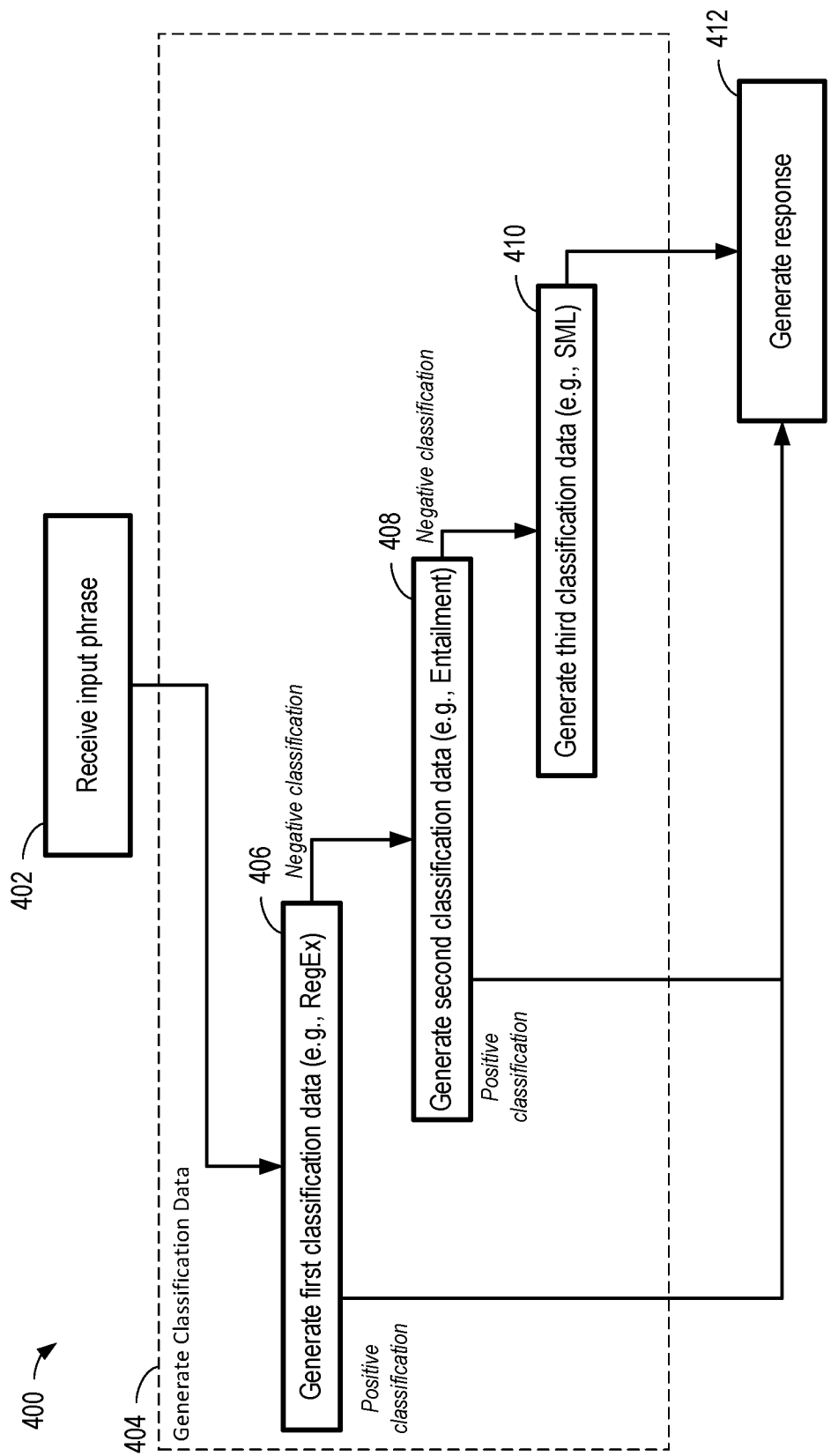
FIG. 4 is a flowchart depicting a cascading process for classifying an input phrase and generating a response, according to certain aspects of the present disclosure.

FIG. 4 is a flowchart depicting a cascading process 400 for classifying an input phrase and generating a response, according to certain aspects of the present disclosure. Process 400 can be performed using any suitable NLP system, such as the NLP system described with reference to environment 100 of FIG. 1. For example, process 400 can be performed by one or more of the user device 102 and the server(s) 106 of FIG. 1.

At block 402, an input phrase can be received. Receiving the input phrase at block 402 can be the same as receiving the input phrase at block 302 of FIG. 3.

At block 404, classification data can be generated. The generated classification data can be used to generate a response at block 412. Generating the response at block 412 can be the same as generating a response at block 312 of FIG. 3.

Generating classification data at block 404 can be similar to generating classification data at block 304 of FIG. 3, but using a cascading classification scheme. The cascading classification scheme involves generating first classification data using a first classifier (e.g., a RegEx classifier or other) at block 406. If a positive classification is made (e.g., the RegEx classifier identifies a topic to use), that classification data can be output and used to generate a response at block 412. However, if a negative classification is made (e.g., the RegEx classifier does not identify a topic), the input phrase is passed to a second classifier (e.g., an entailment classifier) for generation of second classification data at block 408. If a positive classification is made (e.g., the entailment classifier identifies at least one topic, optionally associated with a confidence score above a threshold confidence score, and optionally with a particular entailment value or values), that classification data can be output and used to generate a response at block 412. However, if a negative classification is made (e.g., the entailment classifier does not identify a topic, optionally one with a sufficiently high confidence score, and optionally one with a particular entailment value or values), then the input phrase can be passed to a third classifier (e.g., an SML classifier) for generation of third classification data at block 410. The third classification data from block 410 can then be output to generate a response at block 412. If the third classification data is a positive classification, the one or more identified topics can be used to generate the response. If the third classification data is a negative classification, a response can be generated accordingly (e.g., requesting the user provide an alternate input phrase or provide additional information).

While described with reference to three classifiers, generating classification data at block 404 can be performed using any suitable number of two or more classifiers. For example, if only two classifiers were used, the second classification data from block 408 can be output to generate the response at block 412 regardless of whether a positive or negative classification was made.

The examples used for the first, second, and third classifiers with reference to blocks 406, 408, 410 are examples of an especially useful combination starting with the fastest classifier (e.g., a pattern matching classifier, such as RegEx), following up with the classifier most likely to obtain specific results (e.g., an entailment classifier), and finishing with the classifier most likely to obtain any result, even if not as specific (e.g., an SML classifier, such as a BERT classifier). However, in some cases, other combinations and orders of classifiers can be used, such as by starting with an entailment classifier.

Process 400 is depicted with a certain arrangement of blocks, however in other cases, these blocks can be performed in different orders, with additional blocks, and/or some blocks removed. For example, in some cases, block 408 can be performed before block 406, with its block 406 only being performed upon a negative classification from block 408. As another example, in some cases, block 410 can be removed.

Figure 5:
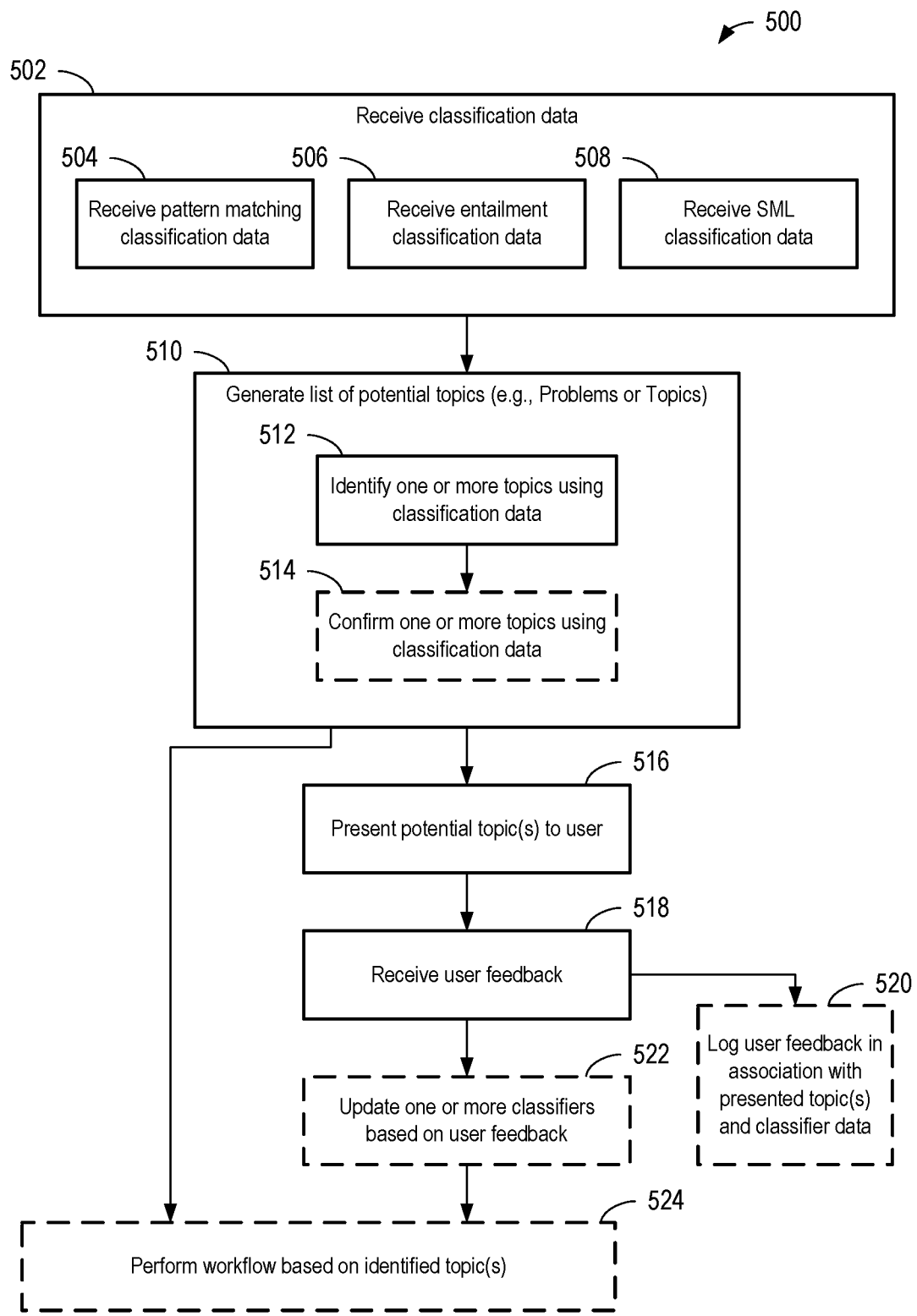
FIG. 5 is a flowchart depicting a process for classifying an input phrase and performing a workflow, according to certain aspects of the present disclosure.

FIG. 5 is a flowchart depicting a process 500 for classifying an input phrase and performing a workflow, according to certain aspects of the present disclosure. Process 500 can be performed using any suitable NLP system, such as the NLP system described with reference to environment 100 of FIG. 1. For example, process 500 can be performed by one or more of the user device 102 and the server(s) 106 of FIG. 1. In some cases, certain blocks of process 500 can be performed as part of generating classification data at blocks 304 or 404 of FIG. 3 or 4, respectively.

At block 502, classification data is received. Classification data can include entailment classification data received from an entailment classifier at block 506, and optionally at least one of pattern matching classification data received from a pattern matching classifier at block 504 and SML classification data received from an SML classifier at block 508. In some cases, process 500 can be performed entirely or primarily on a server, in which case receiving classification data at block 502 can include receiving the classification data via a network interface, such as from a user device networked to the server via the Internet.

Using the classification data from block 502, a list of potential topics can be generated. Generating the list of potential topics can include identifying one or more topics using the classification data at block 512. The one or more identified potential topics can include all topics identified in the classification data, although that need not always be the case. For example, in some cases, only topics having a confidence score above a threshold confidence score (e.g., with the topics in the pattern matching classification data automatically having a maximum confidence score) will be used as identified potential topics.

In some optional cases, generating the list of potential topics at block 510 can further include confirming one or more identified potential topics from block 512 using the classification data. For example, one or more identified potential topics from block 512 associated with a first classifier (or other classification data associated with the first classifier) may be used to confirm that one or more identified potential topics from block 512 is or is not to be used in the final list of potential topics that will be output at block 510.

For example, while an entailment classifier may identify a possible topic associated with a sufficiently high confidence score, the presence of a certain topic from the pattern matching classifier may lead to removal of the entailment classifier's topic from the final list of potential topics. For example, if the entailment classifier identifies "nursing" as a likely topic associated with a sufficiently high confidence score (e.g., a high confidence that the input phrase entails an example phrase associated with the "nursing" topic), that topic may nevertheless not be included in the final list of potential topics if the pattern matching classifier identifies a particular phrase indicative that the user is not asking about nursing in particular, but using that as an example for an overarching problem (e.g., the user is having trouble dealing with all the possible future problems that may arise if the user decides to become pregnant in the future). In such an example, the match from the pattern matching classification data may result in a better-tailored response than that of the entailment classifier.

In some optional cases, the generated list of potential topics, which may include at least one topic, can be output directly to block 524. At block 524, the received one or more topics can be used to perform a workflow (e.g., used to select a workflow to perform and/or used in the performance of a given workflow). Performing a workflow at block 524 can include generating a response, similar to generating a response at blocks 312 or 412 of FIG. 3 or 4. When process 500 is performed entirely or primarily on a server, performing the workflow at block 524 can include causing a workflow to be performed on a user device.

In some cases, the list of one or more potential topics generated at block 510 can be presented to a user at block 516 and feedback can be received at block 518. Feedback received at block 518 can be used to select one or more from the list of potential topics for continued use (e.g., for performance of a workflow at block 524). In such cases, performing a workflow at block 524, can include using the selected topic(s) to perform the workflow (e.g., to select a workflow to perform and/or to use in the performance of a given workflow).

In some cases, presenting the list of potential topics at block 516 can include presenting the list of potential topics directly, such as in list form. For example, the system may present a prompt saying "Your response indicates you may be having trouble with i) nursing; ii) postpartum depression; and iii) anxiety. Is there one you'd like to focus on now?" In some cases, presenting the potential topic(s) can include presenting a first topic and receiving user feedback regarding the first topic before presenting the second topic. In some cases, the topics can be presented in an order (e.g., in an order based on confidence score).

In some cases, the list of potential topics can be presented obliquely at block 516, such as by asking one or more questions usable to differentiate the potential topics. Using the topics of the above example, the system may instead present a prompt saying "I think I can help out a bit with your problems. Would you like to i) start from the big picture down, or ii) start with specifics and gradually pull back to the big picture?" In such an example, the first option may select PPD or anxiety (e.g., broader topics) as the topic, whereas the second option may select nursing (e.g., a narrower topic) as the topic.

At block 518, the user feedback can be received, indicating one or more of the potential topics to use. The selected topic(s) can be optionally logged at block 520. Logging the topic(s) at block 520 can optionally include logging the user feedback from block 518, the presented topics at block 516, and/or any of the classification data received at block 502.

At optional block 522, one or more classifiers (e.g., the pattern matching classifier associated with block 504, the entailment classifier associated with block 506, and/or the SML classifier associated with block 508) can be updated based on the user feedback received at block 518. For example, if the user confirms that a particular topic is intended out of a list of multiple potential topics, that selection can be used to update the pattern matching classifier's pattern matching criteria, update the entailment classifier's entailment comparison dataset(s), and/or further train the SML classifier.

Process 500 is depicted with a certain arrangement of blocks, however in other cases, these blocks can be performed in different orders, with additional blocks, and/or some blocks removed. For example, in some cases, blocks 518 and 520 can be removed. In some cases, blocks 516 is removed or replaced by a block that automatically selects one of the potential topic(s) for use.

Figure 6:
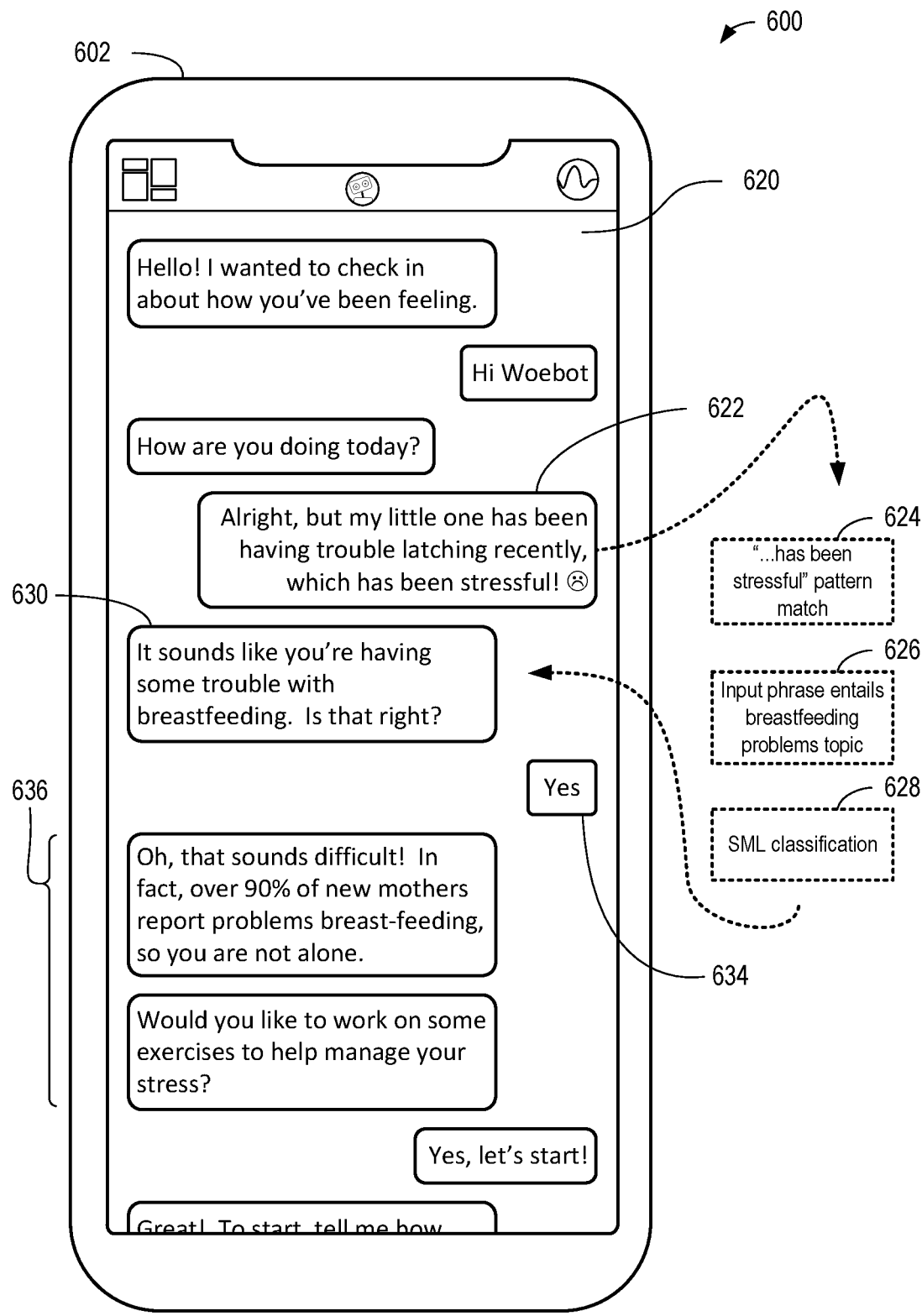
FIG. 6 is a schematic diagram depicting an example conversation path on a graphical user interface, according to certain aspects of the present disclosure.

FIG. 6 is a schematic diagram depicting an example conversation path on a graphical user interface (GUI) 620, according to certain aspects of the present disclosure. GUI 620 can be implemented using any suitable NLP system, such as the NLP system described with reference to environment 100 of FIG. 1. For example, GUI 620 can be implemented on user device 102 of FIG. 1.

The user device 602 can be any suitable user device, such as a smartphone. The GUI 620 presented on the user device 602 can be presented in any suitable fashion, such as in the form of a chat. The GUI 620 of FIG. 6 is an example for illustrative purposes. Any other GUI 620 or techniques for acquiring input phrases and generating responses can be used, such as audio-only techniques.

The input phrase 622 was provided in the chat by the user. Once the user provides the input phrase 622, the NPL system (e.g., using the user device 102 and optionally one or more servers, such as server(s) 106 of FIG. 6) can identify one or more topics, such as a pattern match topic 624, an entailment topic 626, and/or an SML classification topic 628.

In the example of FIG. 6, the system can provide a confirmation prompt 630 to the user based on the one or more identified topics. Here, "trouble with breastfeeding" is either the only identified topic or the first of multiple identified topics to be presented to the user. The user can provide confirmation feedback 634 to the confirmation prompt 630, here indicating that the presented topic is correct. After receiving the confirmation feedback 634, the system can proceed with generating a response 636 based on the identified (and confirmed) topic.

Figure 7:
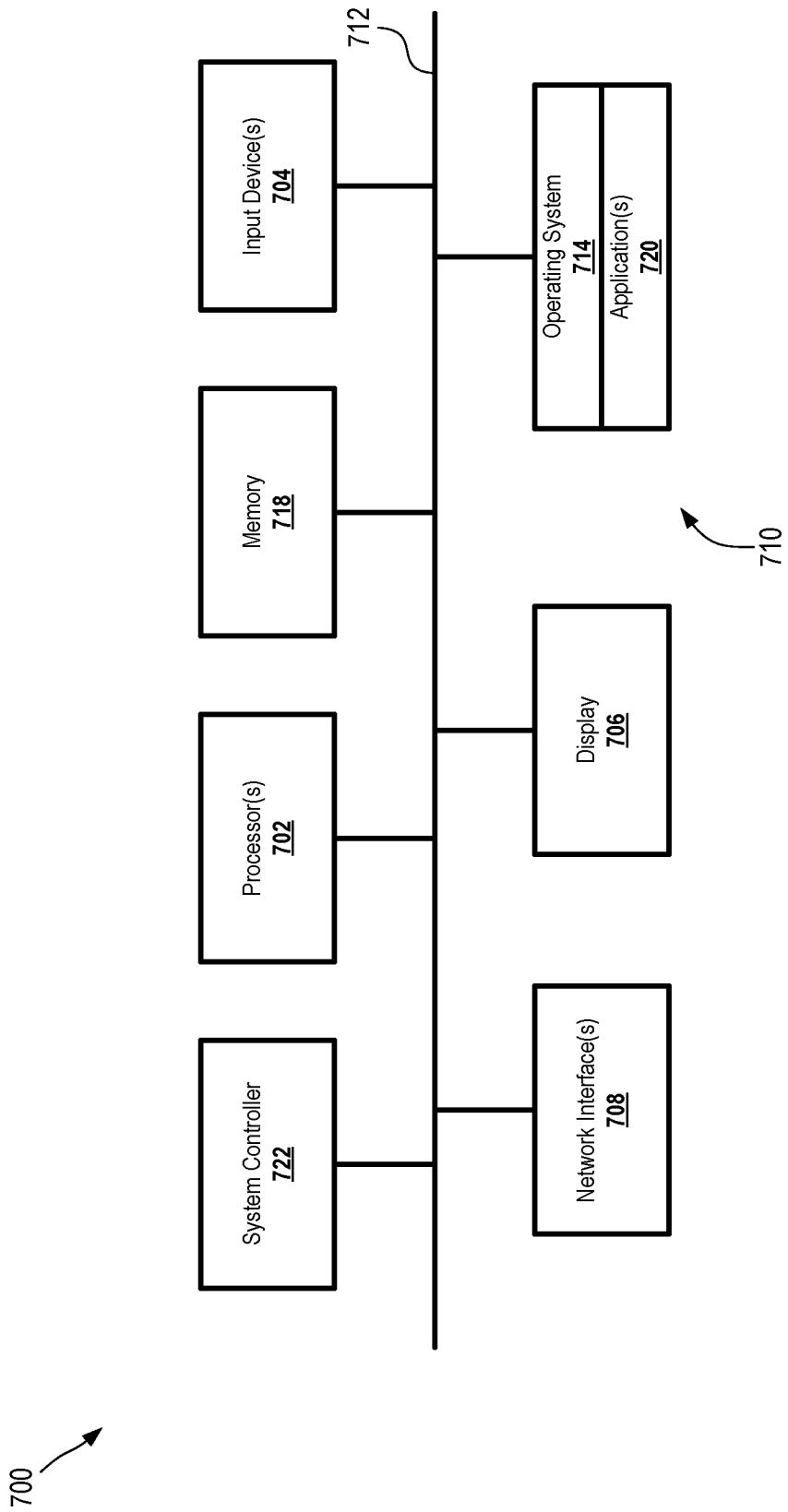
FIG. 7 is a block diagram of an example system architecture for implementing features and processes of the present disclosure.

FIG. 7 is a block diagram of an example system architecture 700 for implementing features and processes of the present disclosure, such as those presented with reference to processes 300, 400, and 500 of FIGS. 3, 4, and 5, respectively. The architecture 700 can be used to implement a server (e.g., server 106 of FIG. 1), a user device (e.g., user device 102 of FIG. 1), or any other suitable device for performing some or all of the aspects of the present disclosure. The architecture 700 can be implemented on any electronic device that runs software applications derived from compiled instructions, including without limitation personal computers, servers, smart phones, electronic tablets, game consoles, email devices, and the like. In some implementations, the architecture 700 can include one or more processors 702, one or more input devices 704, one or more display devices 706, one or more network interfaces 708, and one or more computer-readable mediums 710. Each of these components can be coupled by bus 712.

Display device 706 can be any known display technology, including but not limited to display devices using Liquid Crystal Display (LCD) or Light Emitting Diode (LED) technology. Processor(s) 702 can use any known processor technology, including but not limited to graphics processors and multi-core processors. Input device 704 can be any known input device technology, including but not limited to a keyboard (including a virtual keyboard), mouse, track ball, and touch-sensitive pad or display. In some cases, audio inputs can be used to provide audio signals, such as audio signals of an individual speaking. Bus 712 can be any known internal or external bus technology, including but not limited to ISA, EISA, PCI, PCI Express, NuBus, USB, Serial ATA or FireWire.

Computer-readable medium 710 can be any medium that participates in providing instructions to processor(s) 702 for execution, including without limitation, non-volatile storage media (e.g., optical disks, magnetic disks, flash drives, etc.) or volatile media (e.g., SDRAM, ROM, etc.). The computer-readable medium (e.g., storage devices, mediums, and memories) can include, for example, a cable or wireless signal containing a bit stream and the like. However, when mentioned, non-transitory computer-readable storage media expressly exclude media such as energy, carrier signals, electromagnetic waves, and signals per se.

Computer-readable medium 710 can include various instructions for implementing operating system 714 and applications 720 such as computer programs. The operating system can be multi-user, multiprocessing, multitasking, multithreading, real-time and the like. The operating system 714 performs basic tasks, including but not limited to: recognizing input from input device 704; sending output to display device 706; keeping track of files and directories on computer-readable medium 710; controlling peripheral devices (e.g., storage drives, interface devices, etc.) which can be controlled directly or through an I/O controller; and managing traffic on bus 712. Computer-readable medium 710 can include various instructions for implementing firmware processes, such as a BIOS. Computer-readable medium 710 can include various instructions for implementing any of the processes described herein, including at least processes 300, 400, and 500 of FIGS. 3, 4, and 5, respectively.

Memory 718 can include high-speed random access memory and/or non-volatile memory, such as one or more magnetic disk storage devices, one or more optical storage devices, and/or flash memory (e.g., NAND, NOR). The memory 718 (e.g., computer-readable storage devices, mediums, and memories) can include a cable or wireless signal containing a bit stream and the like. However, when mentioned, non-transitory computer-readable storage media expressly exclude media such as energy, carrier signals, electromagnetic waves, and signals per se. The memory 718 can store an operating system, such as Darwin, RTXC, LINUX, UNIX, OS X, WINDOWS, or an embedded operating system such as VxWorks.

System controller 722 can be a service processor that operates independently of processor 702. In some implementations, system controller 722 can be a baseboard management controller (BMC). For example, a BMC is a specialized service processor that monitors the physical state of a computer, network server, or other hardware device using sensors and communicating with the system administrator through an independent connection. The BMC is configured on the motherboard or main circuit board of the device to be monitored. The sensors of a BMC can measure internal physical variables such as temperature, humidity, power-supply voltage, fan speeds, communications parameters and operating system (OS) functions.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computing system that includes a back-end component, such as a data server, or that includes a middleware component, such as an application server or an Internet server, or that includes a front-end component, such as a client computer having a graphical user interface or an Internet browser, or any combination thereof. The components of the system can be connected by any form or medium of digital data communication such as a communication network. Examples of communication networks include, e.g., a LAN, a WAN, and the computers and networks forming the Internet.

The computing system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an application programming interface (API). An API can define one or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, and the like.

The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art. Numerous changes to the disclosed embodiments can be made in accordance with the disclosure herein, without departing from the spirit or scope of the disclosure. Thus, the breadth and scope of the present disclosure should not be limited by any of the above described embodiments.

Although certain aspects and features of the present disclosure have been illustrated and described with respect to one or more implementations, equivalent alterations and modifications will occur or be known to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application.

The terminology used herein is for the purpose of describing particular embodiments only, and is not intended to be limiting of the disclosure. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

As used below, any reference to a series of examples is to be understood as a reference to each of those examples disjunctively (e.g., "Examples 1-4" is to be understood as "Examples 1, 2, 3, or 4").

Example 1 is a system, comprising: one or more data processors; and a non-transitory computer-readable storage medium containing instructions which, when executed on the one or more data processors, cause the one or more data processors to perform operations including: receiving an input phrase associated with a topic; accessing entailment comparison data, wherein the entailment comparison data includes a plurality of example inputs associated with a plurality of topics, wherein the plurality of topics includes the topic; generating classification data for the input phrase, wherein generating the classification data includes applying an entailment classifier to the input phrase using the entailment comparison data, wherein the generated classification data is indicative of the topic; and generating a response based at least in part on the generated classification data.

Example 2 is the system of example(s) 1, wherein the operations further comprise presenting an input phrase prompt, wherein receiving the input phrase is in response to presenting the input phrase prompt, and wherein presenting the input phrase prompt includes presenting an input field for free text.

Example 3 is the system of example(s) 1 or 2, wherein applying the entailment classifier to the input phrase using the entailment comparison data includes: generating, for each of the plurality of example inputs of the entailment comparison data, an entailment value indicative of whether the input phrase i) implies the respective example input; ii) contradicts the respective example input; or iii) is neutral with respect to the respective example input; generating, for each entailment value, a confidence score; identifying a set of one or more relevant example inputs from the plurality of example inputs based at least in part on the entailment values and the confidence scores; identifying a set of one or more matching topics from the plurality of topics based at least in part on the set of one or more relevant examples inputs; and generating entailment classification data based at least in part on the set of one or more matching topics.

Example 4 is the system of example(s) 1 or 2, wherein applying the entailment classifier to the input phrase using the entailment comparison data includes: generating, for each of the plurality of example inputs of the entailment comparison data, an entailment value indicative of whether the input phrase i) implies the respective example input; ii) contradicts the respective example input; or iii) is neutral with respect to the respective example input; generating, for each entailment value, a confidence score; and determining that the confidence score for each entailment value is below a threshold score; and wherein generating the classification data further includes applying a supervised machine learning (SML) classifier to the input phrase to generate SML classification data in response to determining that the confidence score for each entailment value is below the threshold score, and wherein the generated classification data is based at least in part on the SML classification data.

Example 5 is the system of example(s) 1-4, wherein generating the classification data further includes applying the input phrase to at least one of a pattern matching classifier and a supervised machine learning (SML) classifier.

Example 6 is the system of example(s) 5, wherein generating the classification data includes: applying the pattern matching classifier to the input phrase to generate pattern matching classification data based on one or more preset patterns; and determining that the pattern matching classification data is indicative that the input phrase does not match the one or more preset patterns; wherein applying the entailment classifier to the input phrase generates entailment classification data, wherein applying the entailment classifier to the input phrase occurs in response to determining that the pattern matching classification data is indicative that the input phrase does not match the one or more preset patterns, wherein the entailment classification data is indicative of the topic, and wherein the generated classification data is based at least in part on the entailment classification data.

Example 7 is the system of example(s) 5 or 6, wherein generating the classification data includes: generating entailment classification data in response to applying the entailment classifier to the input phrase; generating at least one of pattern matching classification data and SML classification data using the pattern matching classifier and SML classifier, respectively; and identifying the topic using the entailment classification data and the at least one of the pattern matching classification data and the SML classification data.

Example 8 is the system of example(s) 7, wherein identifying the topic using the entailment classification data and the at least one of the pattern matching classification data and the SML classification data includes: determining one or more possible topics using first data, wherein the first data is selected from the group consisting of the entailment classification data and the at least one of the pattern matching classification data and the SML classification data; and selecting the topic from the one or more possible topics using second data, wherein the second data is selected from the group consisting of the entailment classification data and the at least one of the pattern matching classification data and the SML classification data, and wherein the second data is different from the first data.

Example 9 is the system of example(s) 5-8, wherein the SML classifier is a bidirectional encoder representations from transformers (BERT) classifier.

Example 10 is the system of example(s) 1-9, wherein generating the classification data further includes applying the input phrase to at least one of a pattern matching classifier and a supervised machine learning (SML) classifier to generate pattern matching classification data and SML classification data, respectively; and wherein accessing the comparison entailment data is based at least in part on at least one of the pattern matching classification data and the SML classification data.

Example 11 is the system of example(s) 1-10, wherein accessing the entailment comparison data includes selecting the entailment comparison data from a plurality of potential entailment comparison datasets, wherein each potential entailment comparison dataset is associated with a unique subject matter.

Example 12 is the system of example(s) 1-11, wherein each of the plurality of topics of the entailment comparison data is associated with psychological therapy, and wherein generating the response facilitates delivery of psychological therapy to a user.

Example 13 is the system of example(s) 12, wherein generating the classification data further includes applying the input phrase a supervised machine learning (SML) classifier that has been trained using training data that is not associated with psychological therapy.

Example 14 is a computer-implemented method, comprising: executed on the one or more data processors, cause the one or more data processors to perform operations including: receiving an input phrase associated with a topic; accessing entailment comparison data, wherein the entailment comparison data includes a plurality of example inputs associated with a plurality of topics, wherein the plurality of topics includes the topic; generating classification data for the input phrase, wherein generating the classification data includes applying an entailment classifier to the input phrase using the entailment comparison data, wherein the generated classification data is indicative of the topic; and generating a response based at least in part on the generated classification data.

Example 15 is the method of example(s) 14, further comprising presenting an input phrase prompt, wherein receiving the input phrase is in response to presenting the input phrase prompt, and wherein presenting the input phrase prompt includes presenting an input field for free text.

Example 16 is the method of example(s) 14 or 15, wherein applying the entailment classifier to the input phrase using the entailment comparison data includes: generating, for each of the plurality of example inputs of the entailment comparison data, an entailment value indicative of whether the input phrase i) implies the respective example input; ii) contradicts the respective example input; or iii) is neutral with respect to the respective example input; generating, for each entailment value, a confidence score; identifying a set of one or more relevant example inputs from the plurality of example inputs based at least in part on the entailment values and the confidence scores; identifying a set of one or more matching topics from the plurality of topics based at least in part on the set of one or more relevant examples inputs; and generating entailment classification data based at least in part on the set of one or more matching topics.

Example 17 is the method of example(s) 14 or 15, wherein applying the entailment classifier to the input phrase using the entailment comparison data includes: generating, for each of the plurality of example inputs of the entailment comparison data, an entailment value indicative of whether the input phrase i) implies the respective example input; ii) contradicts the respective example input; or iii) is neutral with respect to the respective example input; generating, for each entailment value, a confidence score; and determining that the confidence score for each entailment value is below a threshold score; and wherein generating the classification data further includes applying a supervised machine learning (SML) classifier to the input phrase to generate SML classification data in response to determining that the confidence score for each entailment value is below the threshold score, and wherein the generated classification data is based at least in part on the SML classification data.

Example 18 is the method of example(s) 14-17, wherein generating the classification data further includes applying the input phrase to at least one of a pattern matching classifier and a supervised machine learning (SML) classifier.

Example 19 is the method of example(s) 18, wherein generating the classification data includes: applying the pattern matching classifier to the input phrase to generate pattern matching classification data based on one or more preset patterns; and determining that the pattern matching classification data is indicative that the input phrase does not match the one or more preset patterns; wherein applying the entailment classifier to the input phrase generates entailment classification data, wherein applying the entailment classifier to the input phrase occurs in response to determining that the pattern matching classification data is indicative that the input phrase does not match the one or more preset patterns, wherein the entailment classification data is indicative of the topic, and wherein the generated classification data is based at least in part on the entailment classification data.

Example 20 is the method of example(s) 18 or 19, wherein generating the classification data includes: generating entailment classification data in response to applying the entailment classifier to the input phrase; generating at least one of pattern matching classification data and SML classification data using the pattern matching classifier and SML classifier, respectively; and identifying the topic using the entailment classification data and the at least one of the pattern matching classification data and the SML classification data.

Example 21 is the method of example(s) 20, wherein identifying the topic using the entailment classification data and the at least one of the pattern matching classification data and the SML classification data includes: determining one or more possible topics using first data, wherein the first data is selected from the group consisting of the entailment classification data and the at least one of the pattern matching classification data and the SML classification data; and selecting the topic from the one or more possible topics using second data, wherein the second data is selected from the group consisting of the entailment classification data and the at least one of the pattern matching classification data and the SML classification data, and wherein the second data is different from the first data.

Example 22 is the method of example(s) 18-21, wherein the SML classifier is a bidirectional encoder representations from transformers (BERT) classifier.

Example 23 is the method of example(s) 14-22, wherein generating the classification data further includes applying the input phrase to at least one of a pattern matching classifier and a supervised machine learning (SML) classifier to generate pattern matching classification data and SML classification data, respectively; and wherein accessing the comparison entailment data is based at least in part on at least one of the pattern matching classification data and the SML classification data.

Example 24 is the method of example(s) 14-23, wherein accessing the entailment comparison data includes selecting the entailment comparison data from a plurality of potential entailment comparison datasets, wherein each potential entailment comparison dataset is associated with a unique subject matter.

Example 25 is the method of example(s) 14-24, wherein each of the plurality of topics of the entailment comparison data is associated with psychological therapy, and wherein generating the response facilitates delivery of psychological therapy to a user.

Example 26 is the method of example(s) 25, wherein generating the classification data further includes applying the input phrase a supervised machine learning (SML) classifier that has been trained using training data that is not associated with psychological therapy.

Example 27 is a computer-program product tangibly embodied in a non-transitory machine-readable storage medium, including instructions configured to cause a data processing apparatus to perform operations including: receiving an input phrase associated with a topic; accessing entailment comparison data, wherein the entailment comparison data includes a plurality of example inputs associated with a plurality of topics, wherein the plurality of topics includes the topic; generating classification data for the input phrase, wherein generating the classification data includes applying an entailment classifier to the input phrase using the entailment comparison data, wherein the generated classification data is indicative of the topic; and generating a response based at least in part on the generated classification data.

Example 28 is the computer-program product of example(s) 27, wherein the operations further comprise presenting an input phrase prompt, wherein receiving the input phrase is in response to presenting the input phrase prompt, and wherein presenting the input phrase prompt includes presenting an input field for free text.

Example 29 is the computer-program product of example(s) 27 or 28, wherein applying the entailment classifier to the input phrase using the entailment comparison data includes: generating, for each of the plurality of example inputs of the entailment comparison data, an entailment value indicative of whether the input phrase i) implies the respective example input; ii) contradicts the respective example input; or iii) is neutral with respect to the respective example input; generating, for each entailment value, a confidence score; identifying a set of one or more relevant example inputs from the plurality of example inputs based at least in part on the entailment values and the confidence scores; identifying a set of one or more matching topics from the plurality of topics based at least in part on the set of one or more relevant examples inputs; and generating entailment classification data based at least in part on the set of one or more matching topics.

Example 30 is the computer-program product of example(s) 27 or 28, wherein applying the entailment classifier to the input phrase using the entailment comparison data includes: generating, for each of the plurality of example inputs of the entailment comparison data, an entailment value indicative of whether the input phrase i) implies the respective example input; ii) contradicts the respective example input; or iii) is neutral with respect to the respective example input; generating, for each entailment value, a confidence score; and determining that the confidence score for each entailment value is below a threshold score; and wherein generating the classification data further includes applying a supervised machine learning (SML) classifier to the input phrase to generate SML classification data in response to determining that the confidence score for each entailment value is below the threshold score, and wherein the generated classification data is based at least in part on the SML classification data.

Example 31 is the computer-program product of example(s) 27-30, wherein generating the classification data further includes applying the input phrase to at least one of a pattern matching classifier and a supervised machine learning (SML) classifier.

Example 32 is the computer-program product of example(s) 31, wherein generating the classification data includes: applying the pattern matching classifier to the input phrase to generate pattern matching classification data based on one or more preset patterns; and determining that the pattern matching classification data is indicative that the input phrase does not match the one or more preset patterns; wherein applying the entailment classifier to the input phrase generates entailment classification data, wherein applying the entailment classifier to the input phrase occurs in response to determining that the pattern matching classification data is indicative that the input phrase does not match the one or more preset patterns, wherein the entailment classification data is indicative of the topic, and wherein the generated classification data is based at least in part on the entailment classification data.

Example 33 is the computer-program product of example(s) 31 or 32, wherein generating the classification data includes: generating entailment classification data in response to applying the entailment classifier to the input phrase; generating at least one of pattern matching classification data and SML classification data using the pattern matching classifier and SML classifier, respectively; and identifying the topic using the entailment classification data and the at least one of the pattern matching classification data and the SML classification data.

Example 34 is the computer-program product of example(s) 33, wherein identifying the topic using the entailment classification data and the at least one of the pattern matching classification data and the SML classification data includes: determining one or more possible topics using first data, wherein the first data is selected from the group consisting of the entailment classification data and the at least one of the pattern matching classification data and the SML classification data; and selecting the topic from the one or more possible topics using second data, wherein the second data is selected from the group consisting of the entailment classification data and the at least one of the pattern matching classification data and the SML classification data, and wherein the second data is different from the first data.

Example 35 is the computer-program product of example(s) 31-34, wherein the SML classifier is a bidirectional encoder representations from transformers (BERT) classifier.

Example 36 is the computer-program product of example(s) 27-35, wherein generating the classification data further includes applying the input phrase to at least one of a pattern matching classifier and a supervised machine learning (SML) classifier to generate pattern matching classification data and SML classification data, respectively; and wherein accessing the comparison entailment data is based at least in part on at least one of the pattern matching classification data and the SML classification data.

Example 37 is the computer-program product of example(s) 27-36, wherein accessing the entailment comparison data includes selecting the entailment comparison data from a plurality of potential entailment comparison datasets, wherein each potential entailment comparison dataset is associated with a unique subject matter.

Example 38 is the computer-program product of example(s) 27-37, wherein each of the plurality of topics of the entailment comparison data is associated with psychological therapy, and wherein generating the response facilitates delivery of psychological therapy to a user.

Example 39 is the computer-program product of example(s) 38, wherein generating the classification data further includes applying the input phrase a supervised machine learning (SML) classifier that has been trained using training data that is not associated with psychological therapy.

What is claimed is:

1. A system, comprising:
one or more data processors; and
a non-transitory computer-readable storage medium containing instructions which, when executed on the one or more data processors, cause the one or more data processors to perform operations including:
receiving an input phrase associated with a topic;
accessing entailment comparison data, wherein the entailment comparison data includes a plurality of example inputs associated with a plurality of topics, wherein the plurality of topics includes the topic;
generating classification data for the input phrase, wherein generating the classification data includes applying an entailment classifier to the input phrase using the entailment comparison data, the entailment classifier including a machine learning model that has been trained to generate entailment values between two phrases, wherein the generated classification data is indicative of the topic, wherein applying the entailment classifier to the input phrase using the entailment comparison data includes:
generating, for each of the plurality of example inputs of the entailment comparison data, an entailment value indicative of whether the input phrase i) implies the respective example input; ii) contradicts the respective example input; or iii) is neutral with respect to the respective example input;
generating, for each entailment value, a confidence score;
identifying a set of one or more relevant example inputs from the plurality of example inputs based at least in part on the entailment values and the confidence scores;
identifying a set of one or more matching topics from the plurality of topics based at least in part on the set of one or more relevant examples inputs; and
generating entailment classification data based at least in part on the set of one or more matching topics; and
generating a response based at least in part on the generated classification data.

2. The system of claim 1, wherein the operations further comprise presenting an input phrase prompt, wherein receiving the input phrase is in response to presenting the input phrase prompt, and wherein presenting the input phrase prompt includes presenting an input field for free text.

3. The system of claim 1, wherein generating the classification data further includes applying the input phrase to at least one of a pattern matching classifier and a supervised machine learning (SML) classifier.

4. The system of claim 3, wherein generating the classification data includes:
applying the pattern matching classifier to the input phrase to generate pattern matching classification data based on one or more preset patterns; and
determining that the pattern matching classification data is indicative that the input phrase does not match the one or more preset patterns;
wherein applying the entailment classifier to the input phrase occurs in response to determining that the pattern matching classification data is indicative that the input phrase does not match the one or more preset patterns, wherein the entailment classification data is indicative of the topic, and wherein the generated classification data is based at least in part on the entailment classification data.

5. The system of claim 3, wherein generating the classification data includes:
generating at least one of pattern matching classification data and SML classification data using the pattern matching classifier and SML classifier, respectively; and
identifying the topic using the entailment classification data and the at least one of the pattern matching classification data and the SML classification data.

6. The system of claim 5, wherein identifying the topic using the entailment classification data and the at least one of the pattern matching classification data and the SML classification data includes:
determining one or more possible topics using first data, wherein the first data is selected from the group consisting of the entailment classification data and the at least one of the pattern matching classification data and the SML classification data; and
selecting the topic from the one or more possible topics using second data, wherein the second data is selected from the group consisting of the entailment classification data and the at least one of the pattern matching classification data and the SML classification data, and wherein the second data is different from the first data.

7. The system of claim 3, wherein the SML classifier is a bidirectional encoder representations from transformers (BERT) classifier.

8. The system of claim 1, wherein generating the classification data further includes applying the input phrase to at least one of a pattern matching classifier and a supervised machine learning (SML) classifier to generate pattern matching classification data and SML classification data, respectively; and wherein accessing the entailment comparison data is based at least in part on at least one of the pattern matching classification data and the SML classification data.

9. The system of claim 1, wherein accessing the entailment comparison data includes selecting the entailment comparison data from a plurality of potential entailment comparison datasets, wherein each potential entailment comparison dataset is associated with a unique subject matter.

10. The system of claim 1, wherein each of the plurality of topics of the entailment comparison data is associated with psychological therapy, and wherein generating the response facilitates delivery of psychological therapy to a user.

11. The system of claim 10, wherein generating the classification data further includes applying the input phrase to a supervised machine learning (SML) classifier that has been trained using training data that is not associated with psychological therapy.

12. A computer-implemented method, comprising:
executed on the one or more data processors, cause the one or more data processors to perform operations including:
receiving an input phrase associated with a topic;
accessing entailment comparison data, wherein the entailment comparison data includes a plurality of example inputs associated with a plurality of topics, wherein the plurality of topics includes the topic;
generating classification data for the input phrase, wherein generating the classification data includes applying an entailment classifier to the input phrase using the entailment comparison data, the entailment classifier including a machine learning model that has been trained to generate entailment values between two phrases, wherein the generated classification data is indicative of the topic, wherein applying the entailment classifier to the input phrase using the entailment comparison data includes:
generating, for each of the plurality of example inputs of the entailment comparison data, an entailment value indicative of whether the input phrase i) implies the respective example input; ii) contradicts the respective example input; or iii) is neutral with respect to the respective example input;
generating, for each entailment value, a confidence score;
identifying a set of one or more relevant example inputs from the plurality of example inputs based at least in part on the entailment values and the confidence scores;
identifying a set of one or more matching topics from the plurality of topics based at least in part on the set of one or more relevant examples inputs; and
generating entailment classification data based at least in part on the set of one or more matching topics; and
generating a response based at least in part on the generated classification data.

13. The method of claim 12, further comprising presenting an input phrase prompt, wherein receiving the input phrase is in response to presenting the input phrase prompt, and wherein presenting the input phrase prompt includes presenting an input field for free text.

14. The method of claim 12, wherein generating the classification data further includes applying the input phrase to at least one of a pattern matching classifier and a supervised machine learning (SML) classifier.

15. The method of claim 14, wherein generating the classification data includes:
applying the pattern matching classifier to the input phrase to generate pattern matching classification data based on one or more preset patterns; and
determining that the pattern matching classification data is indicative that the input phrase does not match the one or more preset patterns;
wherein applying the entailment classifier to the input phrase occurs in response to determining that the pattern matching classification data is indicative that the input phrase does not match the one or more preset patterns, wherein the entailment classification data is indicative of the topic, and wherein the generated classification data is based at least in part on the entailment classification data.

16. The method of claim 14, wherein generating the classification data includes:
generating at least one of pattern matching classification data and SML classification data using the pattern matching classifier and SML classifier, respectively; and
identifying the topic using the entailment classification data and the at least one of the pattern matching classification data and the SML classification data.

17. The method of claim 16, wherein identifying the topic using the entailment classification data and the at least one of the pattern matching classification data and the SML classification data includes:
determining one or more possible topics using first data, wherein the first data is selected from the group consisting of the entailment classification data and the at least one of the pattern matching classification data and the SML classification data; and
selecting the topic from the one or more possible topics using second data, wherein the second data is selected from the group consisting of the entailment classification data and the at least one of the pattern matching classification data and the SML classification data, and wherein the second data is different from the first data.

18. The method of claim 14, wherein the SML classifier is a bidirectional encoder representations from transformers (BERT) classifier.

19. The method of claim 12, wherein generating the classification data further includes applying the input phrase to at least one of a pattern matching classifier and a supervised machine learning (SML) classifier to generate pattern matching classification data and SML classification data, respectively; and wherein accessing the entailment comparison data is based at least in part on at least one of the pattern matching classification data and the SML classification data.

20. The method of claim 12, wherein accessing the entailment comparison data includes selecting the entailment comparison data from a plurality of potential entailment comparison datasets, wherein each potential entailment comparison dataset is associated with a unique subject matter.

21. The method of claim 12, wherein each of the plurality of topics of the entailment comparison data is associated with psychological therapy, and wherein generating the response facilitates delivery of psychological therapy to a user.

22. The method of claim 21, wherein generating the classification data further includes applying the input phrase to a supervised machine learning (SML) classifier that has been trained using training data that is not associated with psychological therapy.

23. A computer-program product tangibly embodied in a non-transitory machine-readable storage medium, including instructions configured to cause a data processing apparatus to perform operations including:
receiving an input phrase associated with a topic;
accessing entailment comparison data, wherein the entailment comparison data includes a plurality of example inputs associated with a plurality of topics, wherein the plurality of topics includes the topic;
generating classification data for the input phrase, wherein generating the classification data includes applying an entailment classifier to the input phrase using the entailment comparison data, the entailment classifier including a machine learning model that has been trained to generate entailment values between two phrases, wherein the generated classification data is indicative of the topic, wherein applying the entailment classifier to the input phrase using the entailment comparison data includes:
generating, for each of the plurality of example inputs of the entailment comparison data, an entailment value indicative of whether the input phrase i) implies the respective example input; ii) contradicts the respective example input; or iii) is neutral with respect to the respective example input;
generating, for each entailment value, a confidence score;
identifying a set of one or more relevant example inputs from the plurality of example inputs based at least in part on the entailment values and the confidence scores;
identifying a set of one or more matching topics from the plurality of topics based at least in part on the set of one or more relevant examples inputs; and
generating entailment classification data based at least in part on the set of one or more matching topics; and
generating a response based at least in part on the generated classification data.

24. The computer-program product of claim 23, wherein the operations further comprise presenting an input phrase prompt, wherein receiving the input phrase is in response to presenting the input phrase prompt, and wherein presenting the input phrase prompt includes presenting an input field for free text.

25. The computer-program product of claim 23, wherein generating the classification data further includes applying the input phrase to at least one of a pattern matching classifier and a supervised machine learning (SML) classifier.

26. The computer-program product of claim 25, wherein generating the classification data includes:
applying the pattern matching classifier to the input phrase to generate pattern matching classification data based on one or more preset patterns; and
determining that the pattern matching classification data is indicative that the input phrase does not match the one or more preset patterns;
wherein applying the entailment classifier to the input phrase occurs in response to determining that the pattern matching classification data is indicative that the input phrase does not match the one or more preset patterns, wherein the entailment classification data is indicative of the topic, and wherein the generated classification data is based at least in part on the entailment classification data.

27. The computer-program product of claim 25, wherein generating the classification data includes:
generating at least one of pattern matching classification data and SML classification data using the pattern matching classifier and SML classifier, respectively; and
identifying the topic using the entailment classification data and the at least one of the pattern matching classification data and the SML classification data.

28. The computer-program product of claim 27, wherein identifying the topic using the entailment classification data and the at least one of the pattern matching classification data and the SML classification data includes:
determining one or more possible topics using first data, wherein the first data is selected from the group consisting of the entailment classification data and the at least one of the pattern matching classification data and the SML classification data; and
selecting the topic from the one or more possible topics using second data, wherein the second data is selected from the group consisting of the entailment classification data and the at least one of the pattern matching classification data and the SML classification data, and wherein the second data is different from the first data.

29. The computer-program product of claim 23, wherein generating the classification data further includes applying the input phrase to at least one of a pattern matching classifier and a supervised machine learning (SML) classifier to generate pattern matching classification data and SML classification data, respectively; and wherein accessing the entailment comparison data is based at least in part on at least one of the pattern matching classification data and the SML classification data.

30. The computer-program product of claim 23, wherein each of the plurality of topics of the entailment comparison data is associated with psychological therapy, wherein generating the response facilitates delivery of psychological therapy to a user, and wherein generating the classification data further includes applying the input phrase to a supervised machine learning (SML) classifier that has been trained using training data that is not associated with psychological therapy.

* * * * *